(12) United States Patent
Kim et al.

(10) Patent No.: US 12,317,189 B2
(45) Date of Patent: May 27, 2025

(54) SHARING BUFFER INFORMATION FOR MULTI-LINK TRANSMISSION

(71) Applicant: LG ELECTRONICS INC., Seoul (KR)

(72) Inventors: Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 17/800,148

(22) PCT Filed: Feb. 18, 2021

(86) PCT No.: PCT/KR2021/002062
§ 371 (c)(1),
(2) Date: Aug. 16, 2022

(87) PCT Pub. No.: WO2021/167366
PCT Pub. Date: Aug. 26, 2021

(65) Prior Publication Data
US 2023/0107072 A1      Apr. 6, 2023

(30) Foreign Application Priority Data

Feb. 18, 2020 (KR) .......... 10-2020-0019932
Feb. 18, 2020 (KR) .......... 10-2020-0019942
Feb. 20, 2020 (KR) .......... 10-2020-0021228

(51) Int. Cl.
*H04W 28/02* (2009.01)
*H04W 52/02* (2009.01)
*H04W 84/12* (2009.01)

(52) U.S. Cl.
CPC ..... *H04W 52/0229* (2013.01); *H04W 28/0278* (2013.01); *H04W 84/12* (2013.01)

(58) Field of Classification Search
None
See application file for complete search history.

(56) References Cited

U.S. PATENT DOCUMENTS

2019/0394681 A1    12/2019  Garcia-Saavedra et al.
2021/0144787 A1*    5/2021  Kwon ............... H04W 72/23
(Continued)

FOREIGN PATENT DOCUMENTS

KR  10-2016-0121876 A   10/2016
KR  10-2017-0107048 A    9/2017
KR  10-2019-0004287 A    1/2019

OTHER PUBLICATIONS

R2-1713803, (Nov. 17, 2017), 3GPP TSG-RAN WG2 Meeting RAN2 #100, R2-17113804, Reno, USA, Nov. 27-Dec. 1, 2017, Resubmission of R2-1711703, Agenda item: 10.3.1.10, Source: Qualcomm, Title: Wakeup Signaling for multi-beam systems, WID/SID: NR_newRAT-Core—Release 15, Document for: Discussion and Decision (6 pages).

*Primary Examiner* — Kouroush Mohebbi
(74) *Attorney, Agent, or Firm* — BRYAN CAVE LEIGHTON PAISNER LLP

(57) ABSTRACT

In a wireless local area network (WLAN) system, a multi-link device (MLD) including a station (STA) MLD and an access point (AP) MLD is proposed. Based on the disclosure, an STA MLD may receive information related to an amount of traffic to be transmitted by an AP MLD to the STA MLD, and may determine STAs to transition to an awake state on the basis of the information.

8 Claims, 45 Drawing Sheets

(56) References Cited

U.S. PATENT DOCUMENTS

| | | | |
|---|---|---|---|
| 2021/0250858 A1* | 8/2021 | Chen | H04W 72/0446 |
| 2023/0147636 A1* | 5/2023 | Kim | H04L 5/0055 |
| | | | 370/318 |
| 2023/0284144 A1* | 9/2023 | Kim | H04W 76/15 |
| | | | 370/338 |
| 2024/0049045 A1* | 2/2024 | Kim | H04W 28/0278 |

* cited by examiner (a)

| Element ID | Length | Non-AP STA information | Queue size |
|---|---|---|---|

Repeat for each non-AP STA indicated in non-AP STA information

FIG. 36

| Variant | B0 | B1 | B2-B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | A-Control | | |

Bits:  variable   0 or more

FIG. 39

| Control ID (NMB) | Queue Size All |

FIG. 40

| Control ID (NMB) | Scaling Factor | Queue Size All |
|---|---|---|

FIG. 41

| B0 | B1 | B2 | B3 |
|---|---|---|---|
| AC_BE | AC_BK | AC_VI | AC_VO |

FIG. 42

| Control ID (NMB) | ACI Bitmap | Delta TID | ACI High | Scaling Factor | Queue Size High | Queue Size All |

FIG. 43

| ACI Bitmap | Delta TID | ACI High | Scaling Factor | Queue Size High | Queue Size All |
|---|---|---|---|---|---|
| 4 | 2 | 2 | 2 | 8 | 8 |

B0  B3 B4  B5 B6  B7 B8  B9 B10  B17 B18  B25

Bits:

SHARING BUFFER INFORMATION FOR MULTI-LINK TRANSMISSION

CROSS-REFERENCE TO RELATED APPLICATIONS

This application is the National Stage filing under 35 U.S.C. 371 of International Application No. PCT/KR2021/002062, filed on Feb. 18, 2021, which claims priority to Korean Application No. 10-2020-0019932, filed on Feb. 18, 2020, Korean Application No. 10-2020-0019942, filed on Feb. 18, 2020, Korean Application No. 10-2020-0021228, filed on Feb. 20, 2020, the contents of which are all hereby incorporated by reference herein in their entirety.

BACKGROUND

Field of the Disclosure

The present specification relates to a method of sharing buffer information for a multi-link operation in a wireless local area network (WLAN) system.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

A method performed by a station (STA) multi-link device (MLD) in a wireless local area network (WLAN) system according to various embodiments may include a technical feature related to a method for power control in multi-link transmission. The STA MLD of the WLAN system may receive, from an access point (AP) MLD through a first link, a beacon frame including a traffic indication map (TIM) and buffer information related to an amount of traffic to be transmitted by the AP MLD to the STA MLD. The STA MLD may determine an STA to be transitioned from a doze state to an awake state among a plurality of STAs included in the STA MLD, based on the TIM and the buffer information.

According to an example of this specification, an STA MLD may know which type of data will be received based on buffer information transmitted by an AP MLD. Therefore, the STA MLD may determine which STAs will wake up and how many STAs will wake up, based on a type and amount of data to be received. Accordingly, when a small amount of data transmission is expected, only a minimum number of STAs are allowed to wake up, thereby avoiding unnecessary power consumption of a terminal, and when transmission of data requiring low latency is predicted, a sufficient number of STAs are allowed to wake up, thereby advantageously avoiding the latency.

BRIEF DESCRIPTION OF THE DRAWINGS

FIG. 29 illustrates an example of an ML-BSR element (for non-AP MLD).

FIG. 36 illustrates an embodiment of an HT control field.

FIG. 39 illustrates an example of a non-AP MLD BSR (NMB) control subfield.

FIG. 40 illustrates an embodiment of an NMB control subfield.

FIG. 41 illustrates an example of ACI bitmap subfield encoding.

FIG. 42 illustrates an example of an NMB control subfield.

FIG. 43 illustrates an example of a BSR control subfield in an 11ax system.

DETAILED DESCRIPTION

Figure 1:
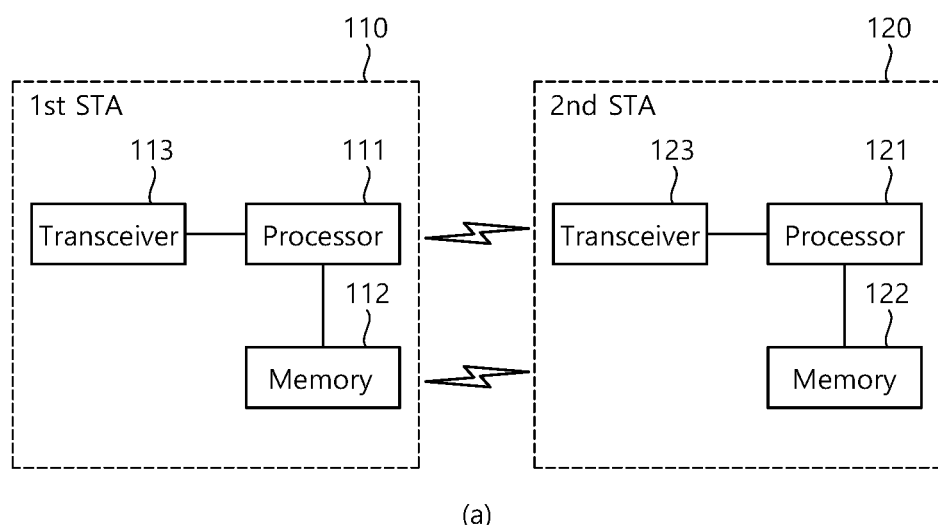
FIG. 1 shows an example of a transmitting apparatus and/or receiving apparatus of the present specification.
Figure 1:
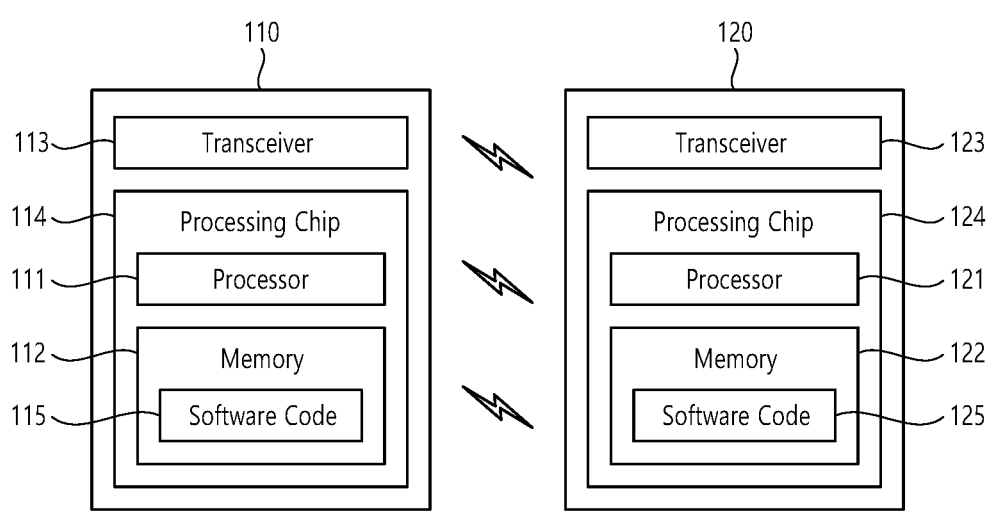

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung@, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
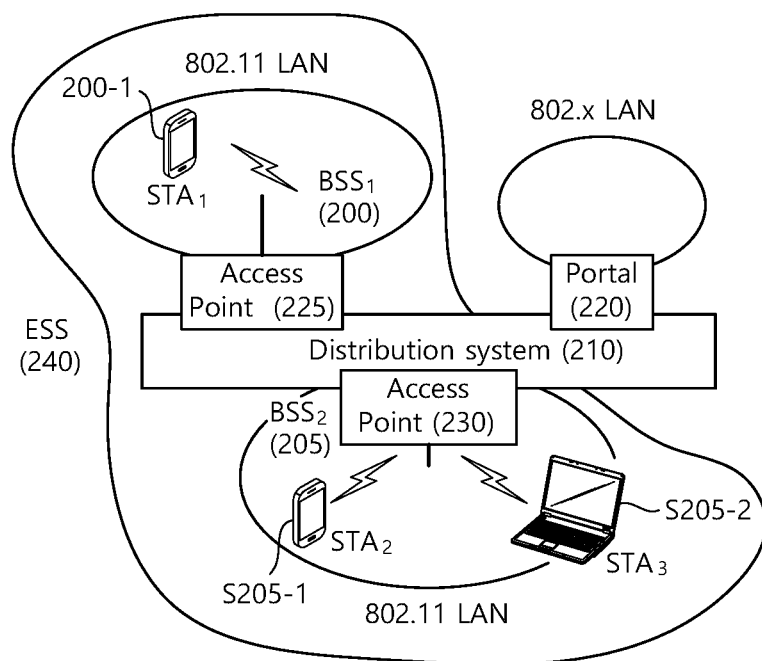
FIG. 2 is a conceptual view illustrating the structure of a wireless local area network (WLAN).
Figure 2:
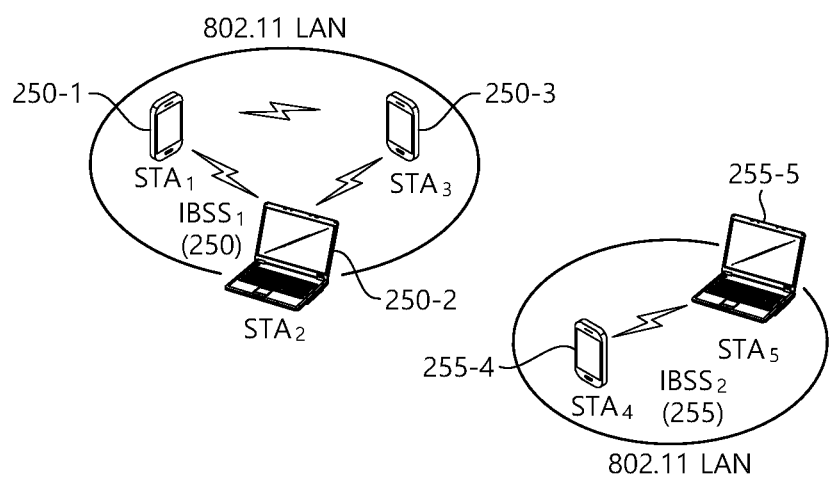

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
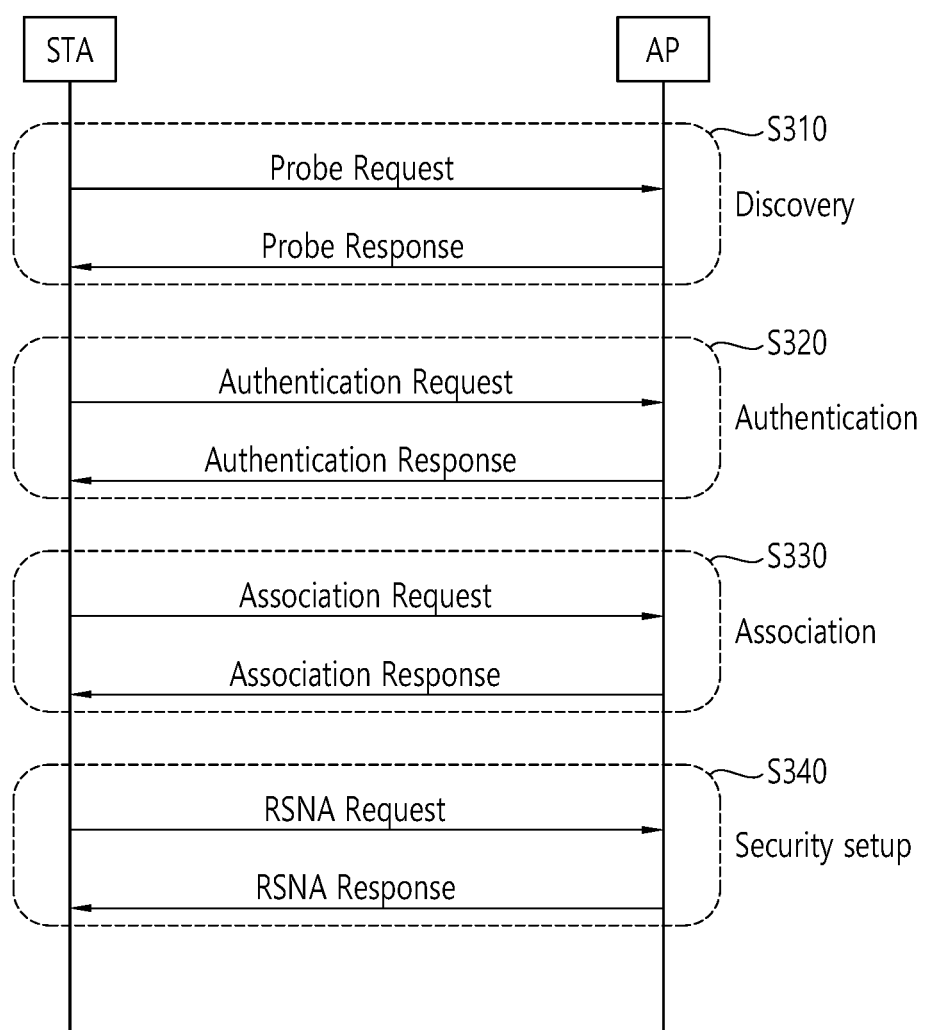
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
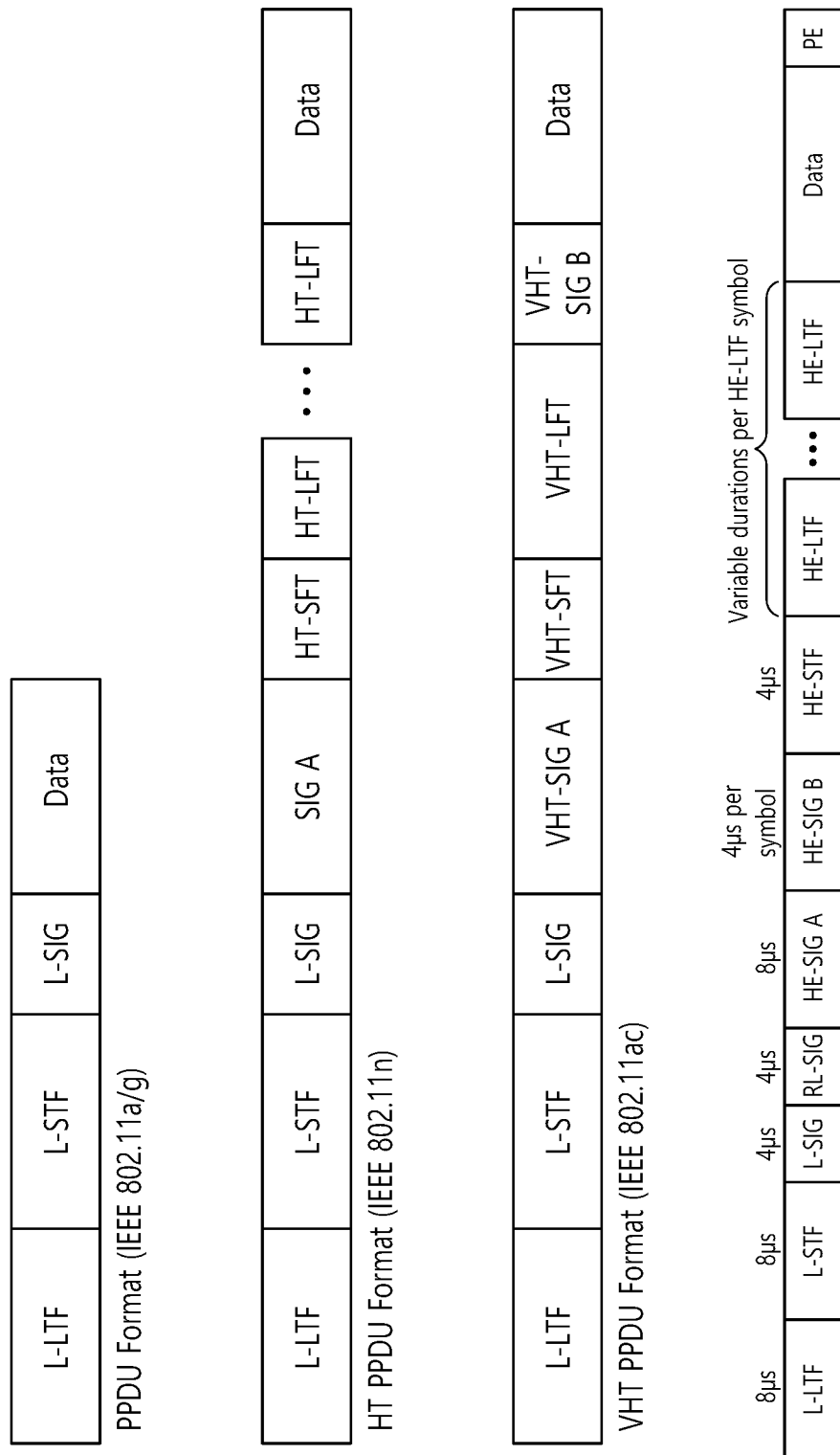
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 s).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
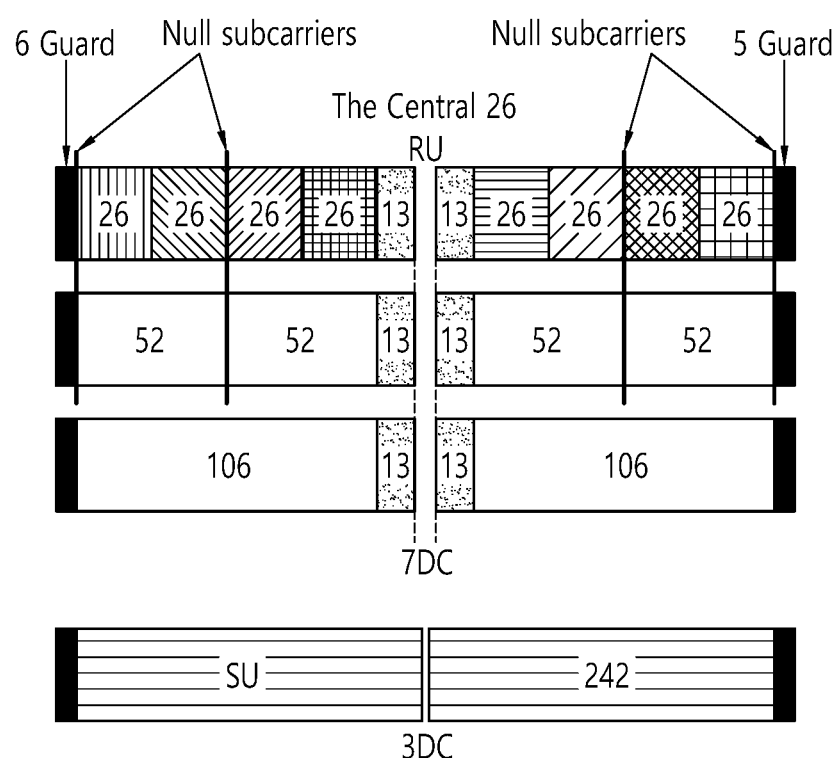
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
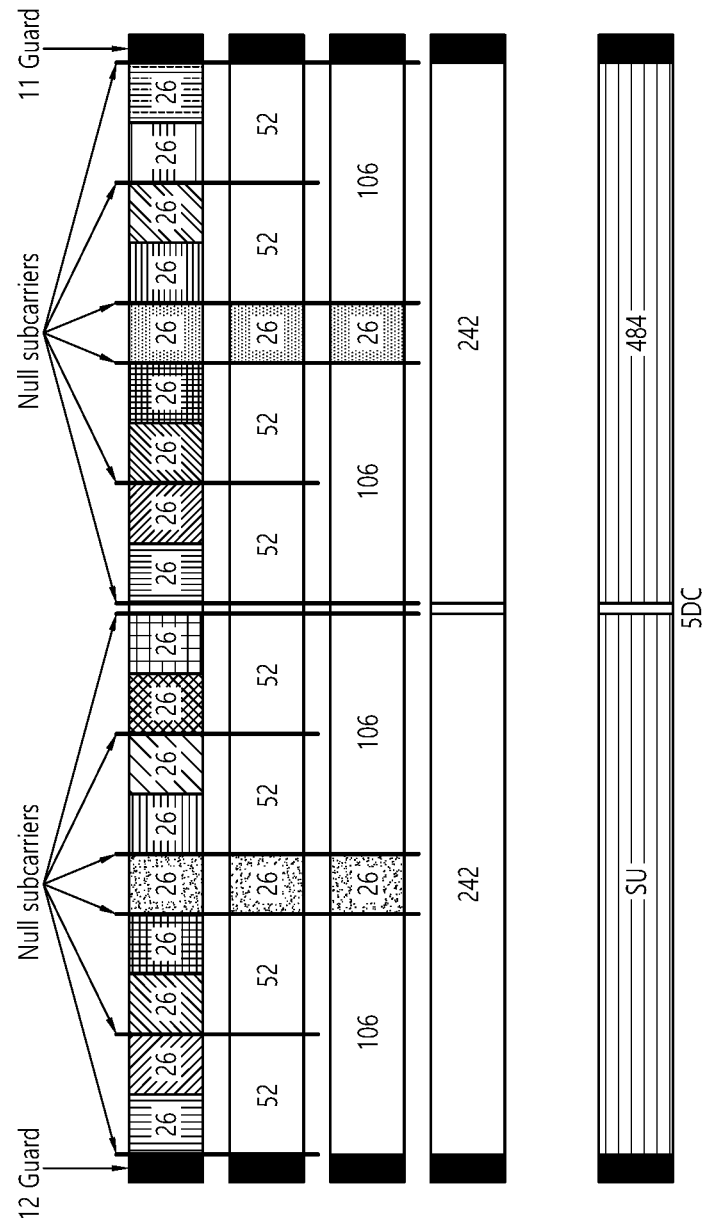
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
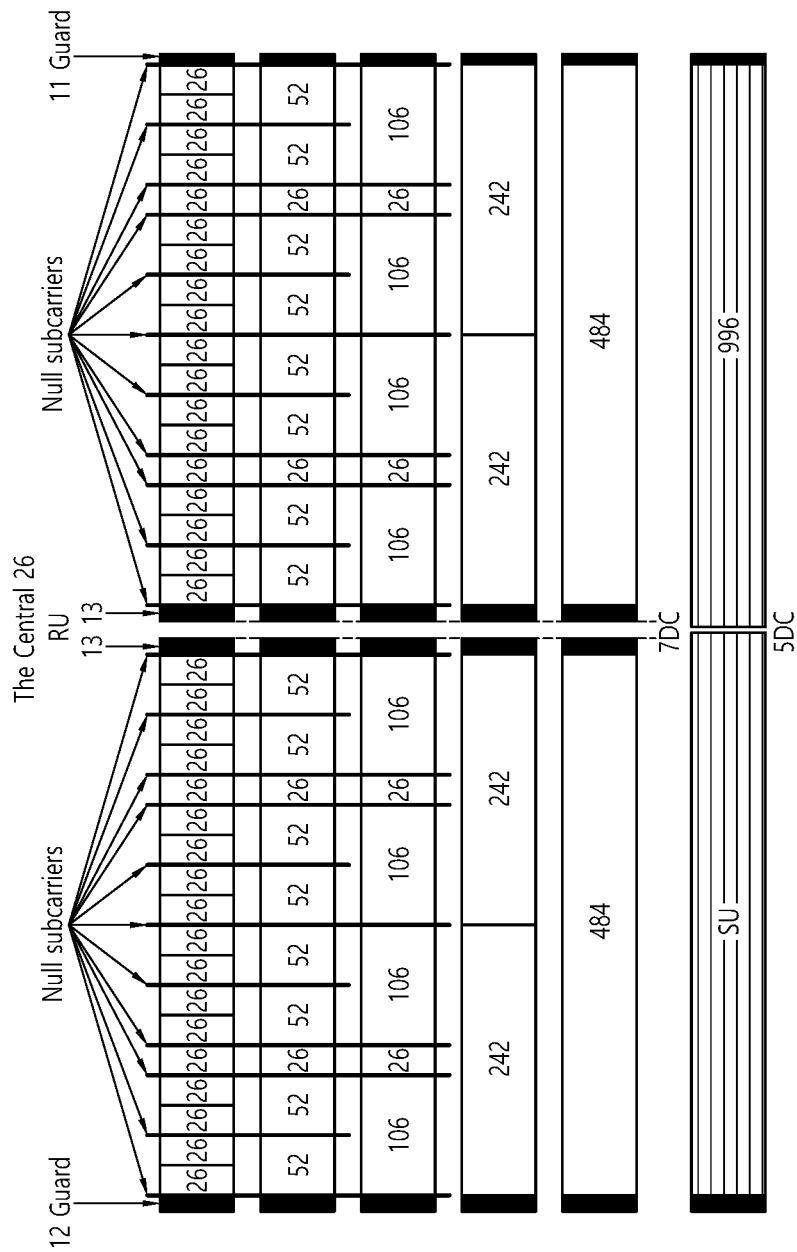
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
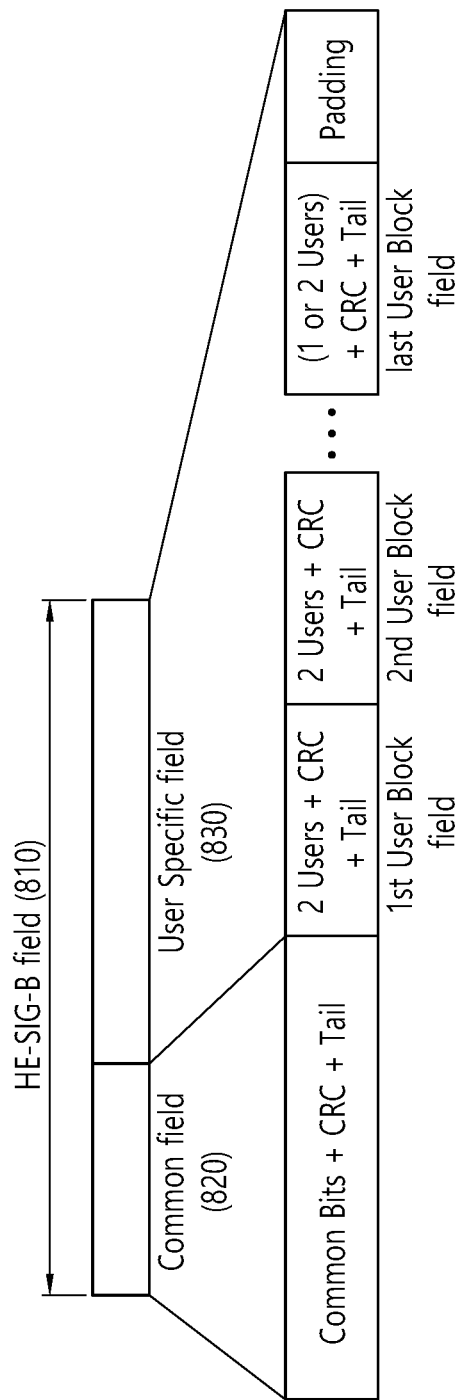
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 | 26 | 26 |  | 1 |
| 00000011 | 26 | 26 | 26 | 26 | 26 | 52 | 52 |  |  | 1 |
| 00000100 | 26 | 26 | 52 |  | 26 | 26 | 26 | 26 | 26 | 1 |
| 00000101 | 26 | 26 | 52 |  | 26 | 26 | 26 | 52 |  | 1 |
| 00000110 | 26 | 26 | 52 |  | 26 | 52 | 26 | 26 |  | 1 |
| 00000111 | 26 | 26 | 52 |  | 26 | 52 | 52 |  |  | 1 |
| 00001000 | 52 |  | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 |  |  |  | 26 | 26 | 26 | 26 | 26 | 8 |
| 01001$y_2y_1y_0$ | 106 |  |  |  | 26 | 26 | 26 | 52 |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
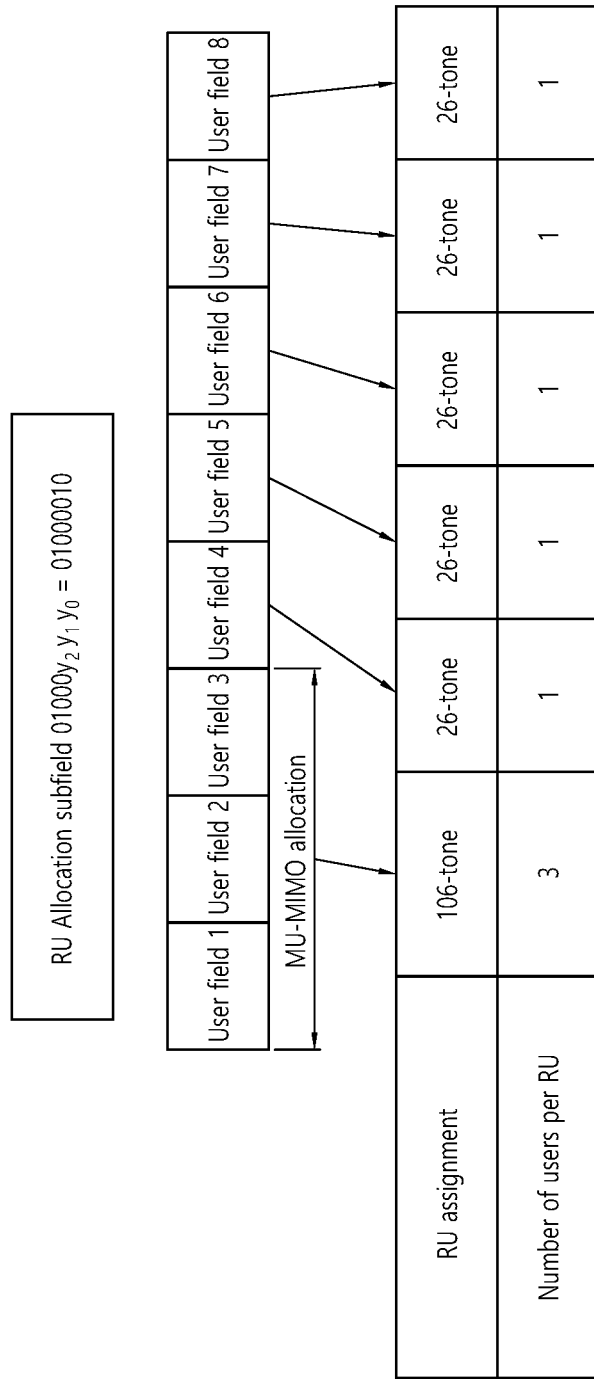
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B314) in the user field (i.e., 21 bits) may include information related to a spatial configuration. Specifically, an example of the second bit (i.e., B11-B14) may be as shown in Table 3 and Table 4 below.

number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $M_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | S | |
| 4 | 0000-0011 | 1-4 | 1 | 1 | 1 | | | | | 4-7 | 11 |
|   | 0100-0110 | 2-4 | 3 | 1 | 1 | | | | | 6-8 | |
|   | 0131 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[17] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 2, and one spatial stream may be allocated to the user field 3.

As shown in the example of Table 3 and/or Table 4, information (i.e., the second bit, B11-B14) related to the Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA.

In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
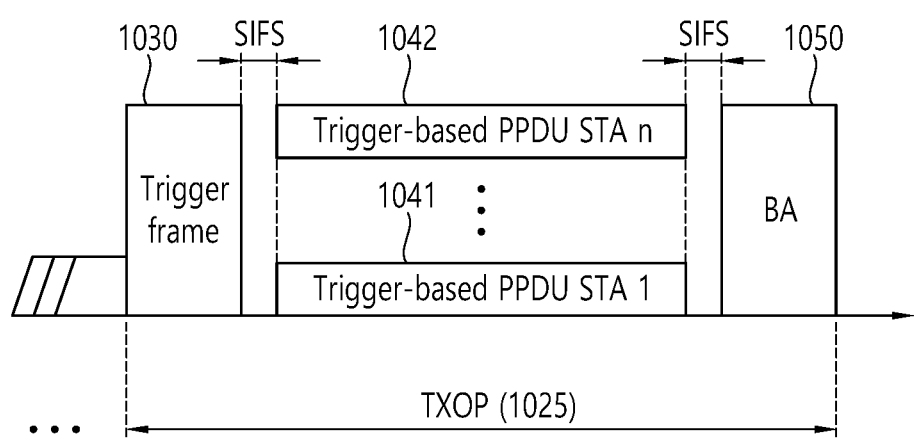
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
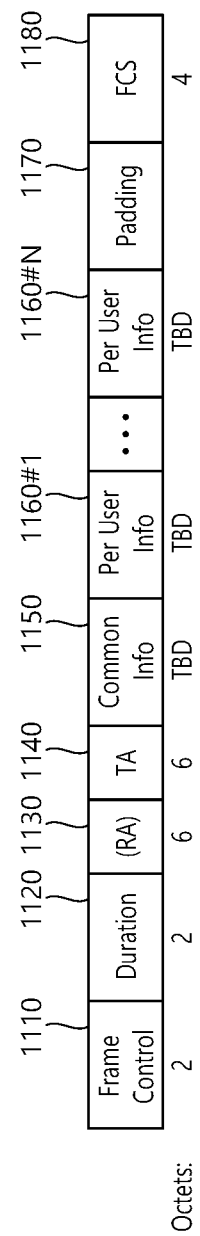
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
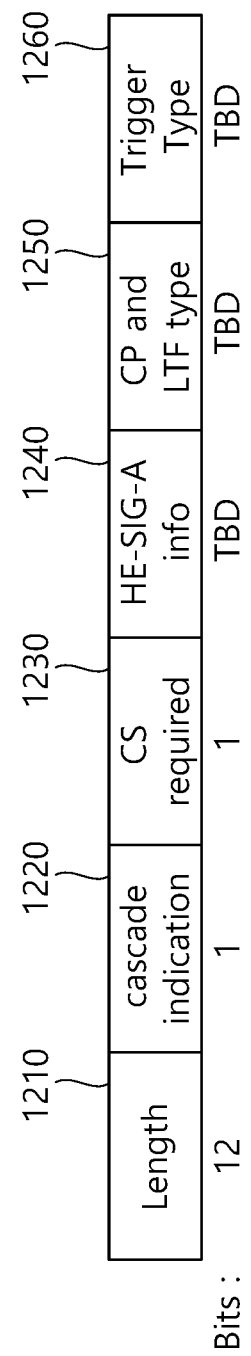
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
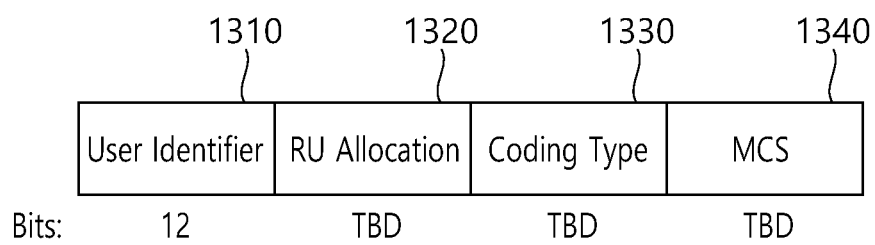
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
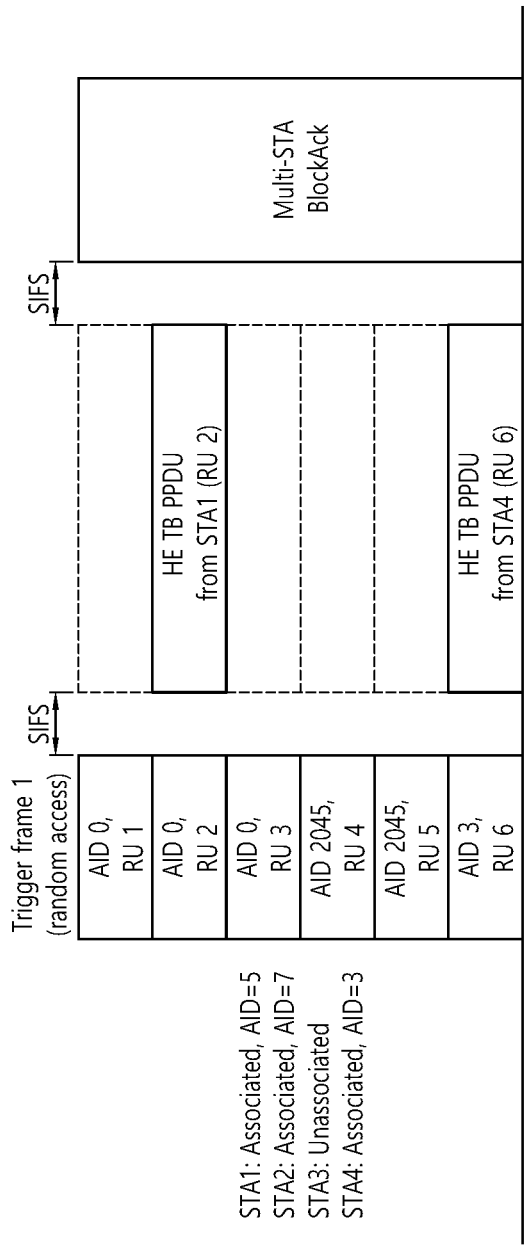
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
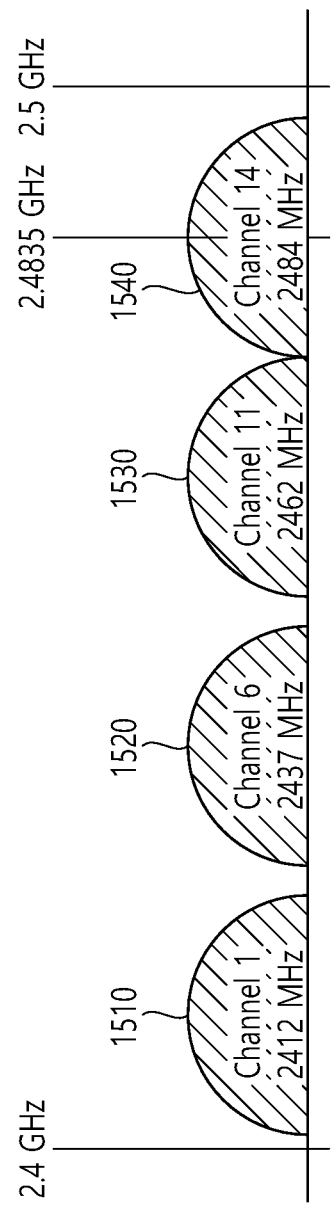
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
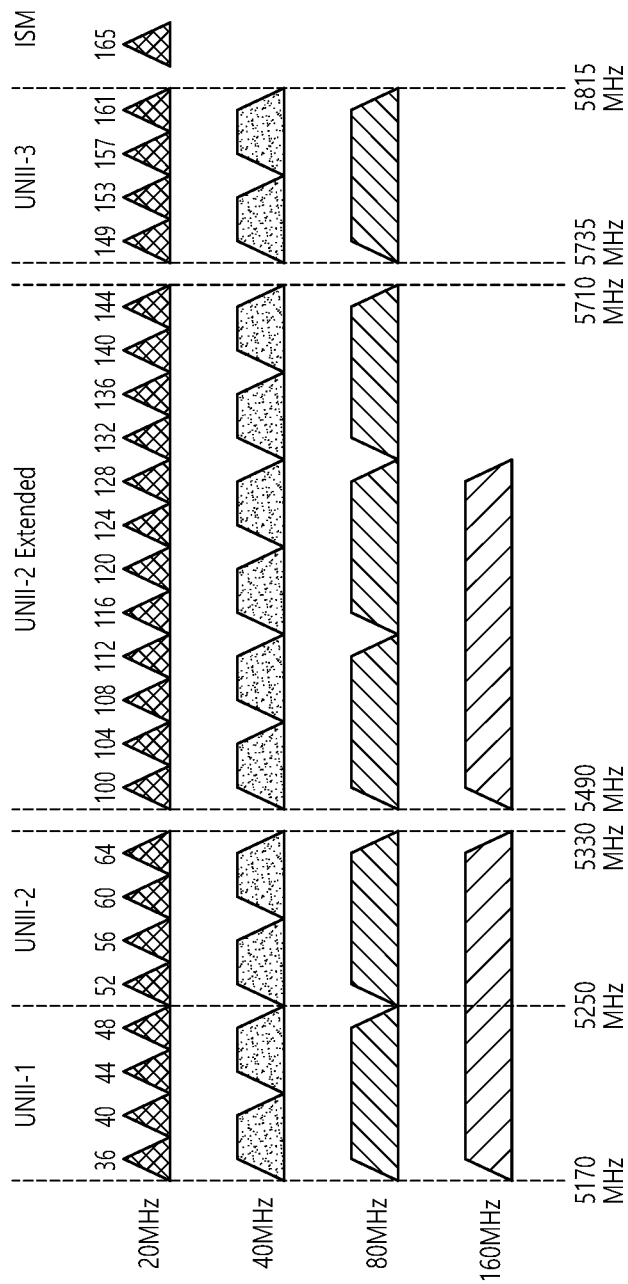
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
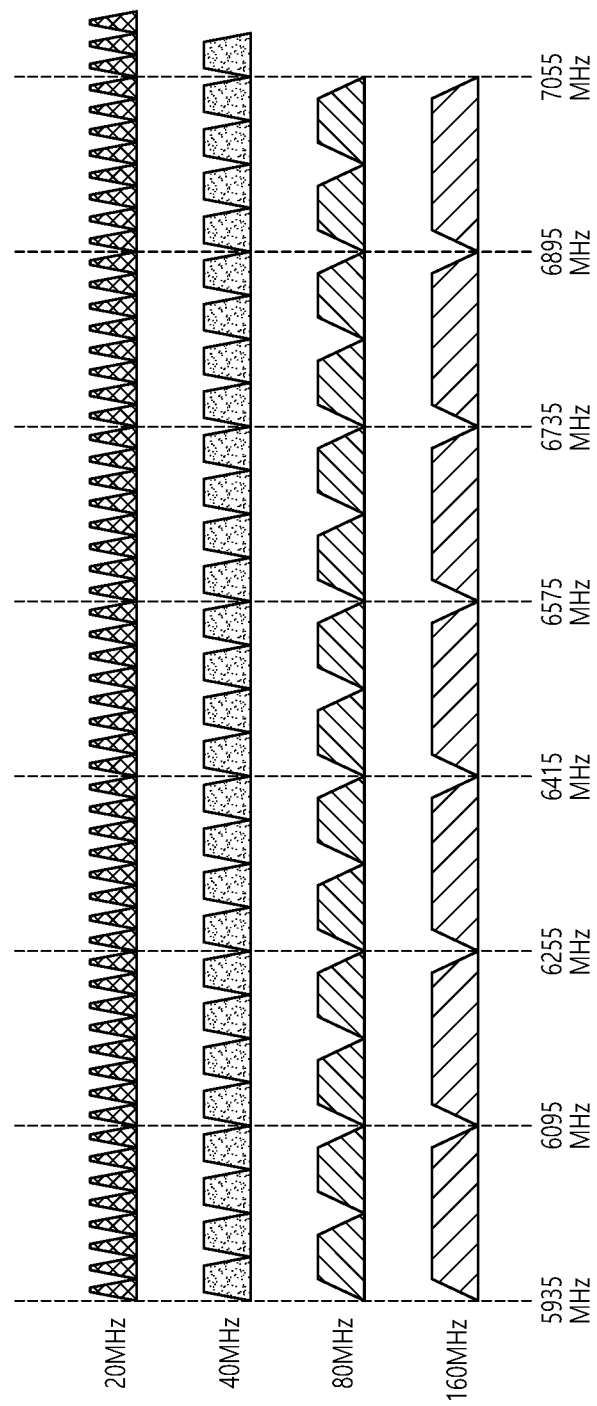
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | | 26 | 26 | 26 | 26 | 1 |
| 5 | 26 | 26 | | 52 | | 26 | 26 | 52 | | 1 |
| 6 | 26 | 26 | | 52 | | 26 | 52 | | 26 | 26 | 1 |
| 7 | 26 | 26 | | 52 | | 26 | 52 | | 52 | | 1 |
| 8 | | 52 | | 26 | 26 | 26 | 26 | 26 | 26 | 1 |
| 9 | | 52 | | 26 | 26 | 26 | 26 | 52 | | 1 |
| 10 | | 52 | | 26 | 26 | 26 | 52 | | 26 | 26 | 1 |
| 11 | | 52 | | 26 | 26 | 26 | 52 | | 52 | | 1 |
| 12 | | 52 | | 52 | | 26 | 26 | 26 | 26 | 1 |
| 13 | | 52 | | 52 | | 26 | 26 | 52 | | 1 |
| 14 | | 52 | | 52 | | 26 | 52 | | 26 | 26 | 1 |
| 15 | | 52 | | 52 | | 26 | 52 | | 52 | | 1 |
| 16 | 26 | 26 | 26 | 26 | 26 | | 106 | | | 1 |
| 17 | 26 | 26 | | 52 | | 26 | | 106 | | | 1 |
| 18 | | 52 | | 26 | 26 | 26 | | 106 | | | 1 |
| 19 | | 52 | | 52 | | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | | 106 | | 26 | 26 | 26 | 26 | 26 | 1 |
| 21 | | | 106 | | 26 | 26 | 26 | 52 | | 1 |
| 22 | | | 106 | | 26 | 52 | | 26 | 26 | 1 |
| 23 | | | 106 | | 26 | 52 | | 52 | | 1 |
| 24 | | 52 | | 52 | | — | | 52 | | 52 | | 1 |
| 25 | | 242-tone RU empty (with zero users) | | | | | | | | 1 |
| 26 | | | 106 | | | 26 | | 106 | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | | 26 | | 52 + 26 | | 26 | 1 |
| 64 | 26 | | 26 + 52 | | 26 | | 52 + 26 | | 26 | 1 |
| 65 | 26 | | 26 + 52 | | 26 | 52 | | 52 | | 1 |

TABLE 7

| 66 | 52 | | 26 | 26 | 26 | | 52 + 26 | | 26 | 1 |
|---|---|---|---|---|---|---|---|---|---|---|
| 67 | 52 | | | 52 | | 26 | | 52 + 26 | | 26 | 1 |
| 68 | 52 | | | 52 + 26 | | | 52 | | 52 | 1 |
| 69 | 26 | 26 | 26 | 26 | | | 26 + 106 | | | 1 |
| 70 | 26 | | 26 + 52 | | 26 | | | 106 | | 1 |
| 71 | 26 | 26 | | 52 | | | | 26 + 106 | | 1 |
| 72 | 26 | | 26 + 52 | | | | 26 + 106 | | | 1 |
| 73 | 52 | | 26 | 26 | | | 26 + 106 | | | 1 |
| 74 | 52 | | | 52 | | | | 26 + 106 | | | 1 |
| 75 | | 106 + 26 | | | 26 | 26 | 26 | 26 | 1 |
| 76 | | 106 + 26 | | | 26 | 26 | | 52 | | 1 |
| 77 | | 106 + 26 | | | 52 | | 26 | 26 | 1 |
| 78 | | 106 | | 26 | | 52 + 26 | | 26 | 1 |
| 79 | | 106 + 26 | | | | 52 + 26 | | 26 | 1 |
| 80 | | 106 + 26 | | | 52 | | 52 | | 1 |
| 81 | | 106 + 26 | | | | 106 | | | 1 |
| 82 | | 106 | | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 s, and a periodicity signal of 0.8 s may be repeated 5 times to become a first type STF having a length of 4 s. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 s, and a periodicity signal of 1.6 s may be repeated 5 times to become a second type STF having a length of 8 s. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1x STF) sequence.

$$\text{EHT-STF}(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1x STF) sequence.

$$\text{EHT-STF}(-496:16:496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1x STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,-M\}*(1+j)/\text{sqrt}(2) \quad \text{<Equation 6>}$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2)$$

$$\text{EHT-STF}(-248)=0$$

$$\text{EHT-STF}(248)=0 \quad \text{<Equation 8>}$$

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 s. In addition, a GI (e.g., 0.8/1/6/3.2 s) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
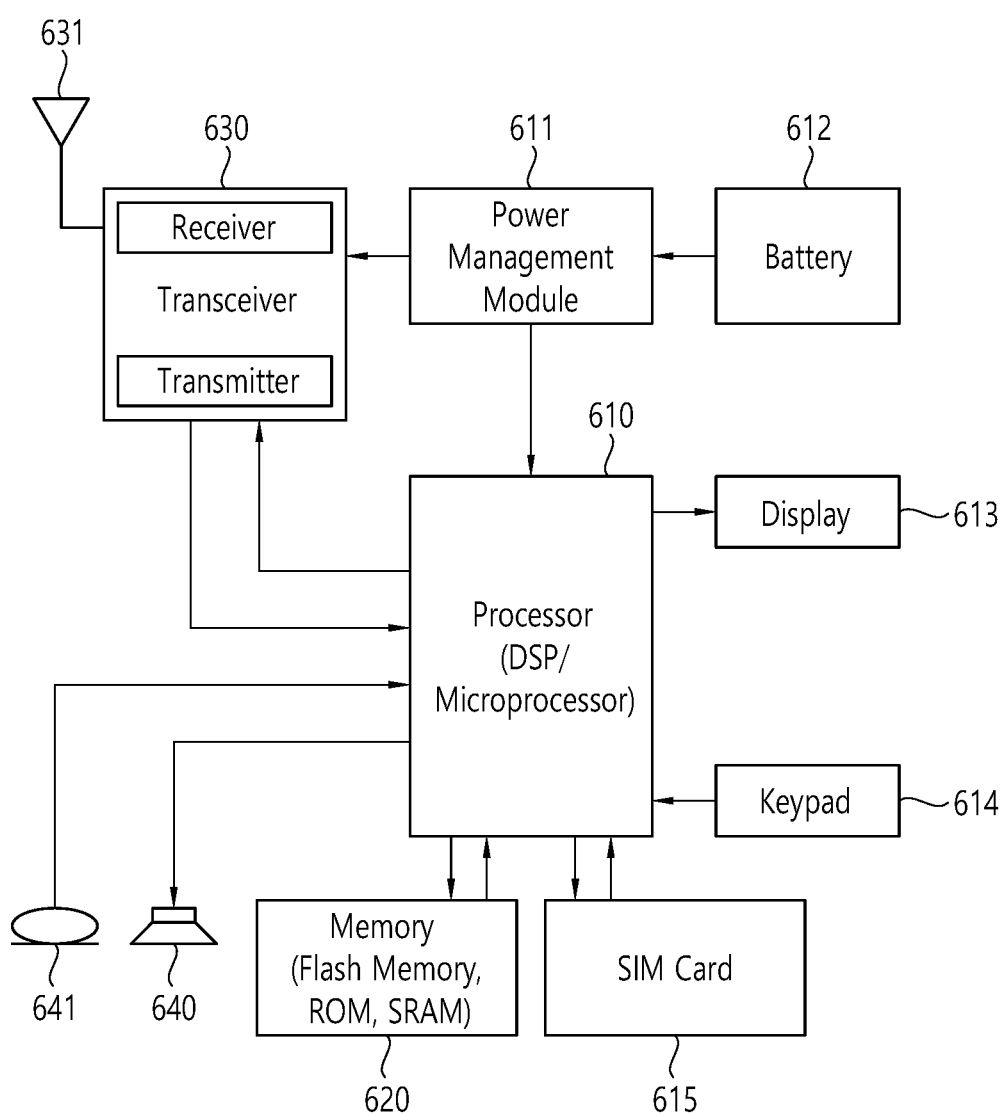
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
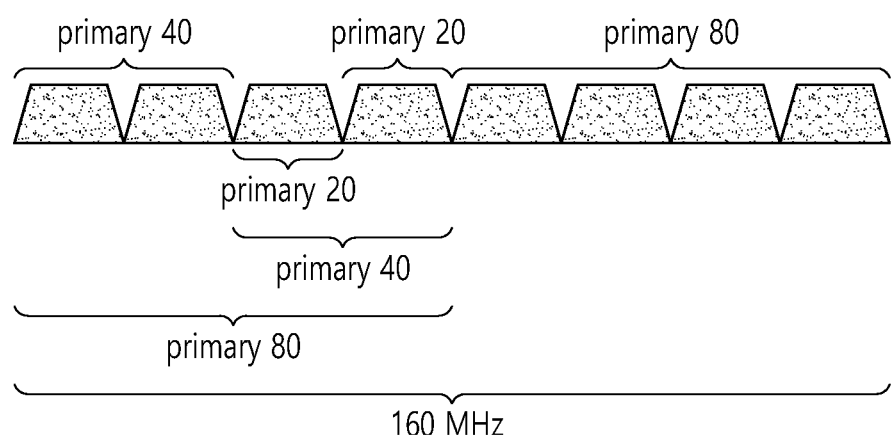
FIG. 20 illustrates an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be expanded in a low signal to noise ratio (SNR) environment, that is, in an environment where the distance between the transmitting terminal and the receiving terminal is long, and higher throughput may be obtained in a high SNR environment.

The device described below may be the apparatus of FIGS. 1 and/or 19, and the PPDU may be the PPDU of FIG. 18. A device may be an AP or a non-AP STA. The device described below may be an AP multi-link device (MLD) supporting multi-link or a non-AP STA MLD.

In extremely high throughput (EHT), a standard being discussed after 802.11ax, a multi-link environment using one or more bands at the same time is being considered. When the device supports multi-link or multi-link, the device may use one or more bands (for example, 2.4 GHz, 5 GHz, 6 GHz, 60 GHz, etc.) simultaneously or alternately.

Hereinafter, although described in the form of multi-link, the frequency band may be configured in various other forms. In this specification, terms such as multi-link, multi-link, and the like may be used, however, for the convenience of the description below, some embodiments may be described based on multi-link.

In the following specification, an MLD refers to a multi-link device. The MLD has one or more connected STAs and one MAC service access point (SAP) that connects to an upper link layer (Logical Link Control, LLC). An MLD may mean a physical device or a logical device. Hereinafter, a device may mean an MLD.

In the following specification, a transmitting device and a receiving device may refer to an MLD. The first link of the receiving/transmitting device may be a terminal (for example, STA or AP) that performs signal transmission/reception through the first link included in the receiving/transmitting device. The second link of the receiving/transmitting device may be a terminal (for example, STA or AP) that performs signal transmission/reception through the second link included in the receiving/transmitting device.

Power Saving Mechanism

The IEEE 802.11 standard provides a power saving mechanism to increase a lifespan of a WLAN station. For power saving, the WLAN station operates in two modes, i.e., an active mode and a sleep mode. The active mode is a state in which a normal operation such as frame transmission/reception, channel scanning, etc., is possible. On the other hand, in the sleep mode, since power consumption is decreased extremely, frame transmission/reception is impossible, and channel scanning is also impossible. A basic operation of power saving is in principle that the WLAN station is usually in a sleep mode and transitions to an active mode only when necessary.

The longer the operation is performed in the sleep mode, the less the power is consumed, thereby the longer the lifespan of the WLAN station. However, it is not preferable to operate in the sleep mode unconditionally since frame transmission/reception is impossible in this mode. If there is a frame to be sent, the sleep mode transitions to an active mode to transmit the frame, and thus there is no significant problem. However, if a station is in the sleep mode and an AP has a frame to be sent to the station, the station cannot receive the frame and cannot know that there is a frame to be received. Therefore, the station must occasionally transition to the active mode and operate in a reception mode to know whether there is a frame to be received by the station and, if the frame exists, to receive the frame. The AP must announce whether there is the frame to be sent to the station at a corresponding time.

In order to know that there is the frame to be received, the WLAN station periodically wakes up from the sleep mode and receives a beacon frame from the AP. By using a TIM element of the beacon frame, the AP reports to each station about whether there is the frame to be received. There are two types of TIM elements, i.e., TIM and DTIM. The TIM is used to indicate a unicast frame, and the DTIM is used to indicate a multicast/broadcast frame.

When the station knows through the TIM element of the beacon frame that there is a frame to be transmitted to the station by the AP, the station transmits a PS-poll frame through contending. Upon receiving the PS-poll frame, the AP operates by selecting either Immediate Response or Deferred Response according to a situation. In the Immediate Response, the PS-poll frame is received and then a data frame is transmitted immediately after an SIFS time. If reception is normally performed, the station transmits an ACK frame after an SIFS and returns to the sleep mode.

If a data frame is not prepared during an SIFS duration after receiving the PS-poll frame, the AP selects Deferred Response. When an ACK frame is first transmitted and thereafter a data frame is prepared, the data frame is transmitted to the station through contending. When the data frame is normally received, the station transmits an ACK frame and returns to the sleep mode.

On the other hand, in case of the DTIM, a multicast/broadcast frame is used. Thus, a beacon frame is followed directly by data frame transmission without PS-poll frame transmission/reception, and all corresponding stations receive this in an active mode.

The WLAN station is associated with the AP and is assigned an association ID (AID). The AID is used uniquely in one BSS, and has a value in the range of 1 to 2007 at present. Since 14 bits are assigned for the AID, up to 16383 can be used. Values in the range of 2008 to 16383 are reserved.

IEEE802.11be can support two types of multi-link operations. For example, simultaneous transmit and receive (STR) and non-STR operations may be considered. For example, an STR may be referred to as an asynchronous multi-link operation, and a non-STR may be referred to as a synchronous multi-link operation. A multi-link may include a multi-band. That is, the multi-link may mean links included in several frequency bands, or may mean a plurality of links included in one frequency band.

EHT (11be) may consider multi-link technology, where multi-link may include multi-band. That is, the multi-link may represent links of several bands and at the same time may represent several multi-links within one band. Two types of multi-link operations are being considered. The asynchronous operation that enables simultaneous TX/RX on multiple links and synchronous operation that is not possible are considered. Hereinafter, the capability that enables simultaneous reception and transmission in multiple links is called STR (simultaneous transmit and receive), a STA having STR capability is called a STR MLD (multi-link device), and a STA not having STR capability is called a non-STR MLD.

In 11be, the multi-link system is a system in which multiple STAs (APs/non-APs) are co-located in one device (multi-link device (MLD)), which may improve performance of a wireless network.

A specific TID may be mapped to specific link(s) among enabled/available links, and traffic for the TID may be transmitted/received through the link(s). Unless otherwise specified, the TID may be basically mapped to all enabled/available links.

An AP may transmit buffered traffic indication information for multiple links through one link, or may transmit buffered traffic indication information for different links through one link. In this case, only one link among available (or enabled) multiple links may operate in a power saving mode. When other links in a doze state receive a traffic indication related to the links through the link operating in the power saving mode, an MLD may expect to receive corresponding traffic by transitioning a corresponding link (e.g., terminal(s)) to an awake state. In this case, if it is assumed that TIDs are mapped to all available links, the terminal may awaken all available links. If a size of data to be actually transmitted from the AP is not great, instead of transitioning all available links to the awake state, the AP may transition only a specific link (or links) to the awake state and then transmit and receive a frame through the awakened links.

Since a traffic indication in the existing single link operation provides only information on whether there is traffic for a corresponding terminal (i.e., link), the corresponding terminal (i.e., link) may be awakened and informs the AP that the corresponding terminal is awakened (e.g., PS-poll frame or QoS null/data frame transmission) to receive a DL frame through a corresponding single link.

However, when a non-AP device (e.g., MLD) with a multi-link has multiple links with respect to an associated AP MLD, there may be case where a specific TID is mapped to a specific link and the non-AP MLD in the non-AP MLD is in a power saving mode. In this case, when the AP MLD receives traffic for the non-AP MLD, a corresponding bit of a traffic indication map (TIM) bitmap may be set to 1 for STAs corresponding to a link mapped to a TID of the corresponding traffic and then it may be transmitted to the non-AP MLD. The non-AP STA/non-AP MLD may receive a TIM bitmap to know for which link the AP has traffic.

If TIDs of the non-AP MLD are mapped to all enabled/available links, the AP may perform transmission by setting a bit corresponding to STAs to 1 in a TIM bitmap in order to awaken non-AP STAs corresponding to all links. In this case, however, since the non-AP MLD does not know how much data the AP MLD actually has, it may be necessary to awaken all STAs mapped to the available links or it may be implemented such that only specific STAs are awakened. Although transitioning of all STAs from the doze state to the awake state has an advantage in that data can be quickly received, since the awakened STAs shall remain in the doze state for a long period of time until DL data is received, power consumption of the non-AP MLD may be increased.

Method 0: Upon receiving traffic for a TID mapped to all available links in the non-AP MLD, an AP reports to a non-AP MLD about corresponding all available links (or corresponding STAs) through a traffic indication bitmap, and the non-AP MLD uses this information to transition a state of a non-AP STA corresponding to each link to an awake state.

Figure 21:
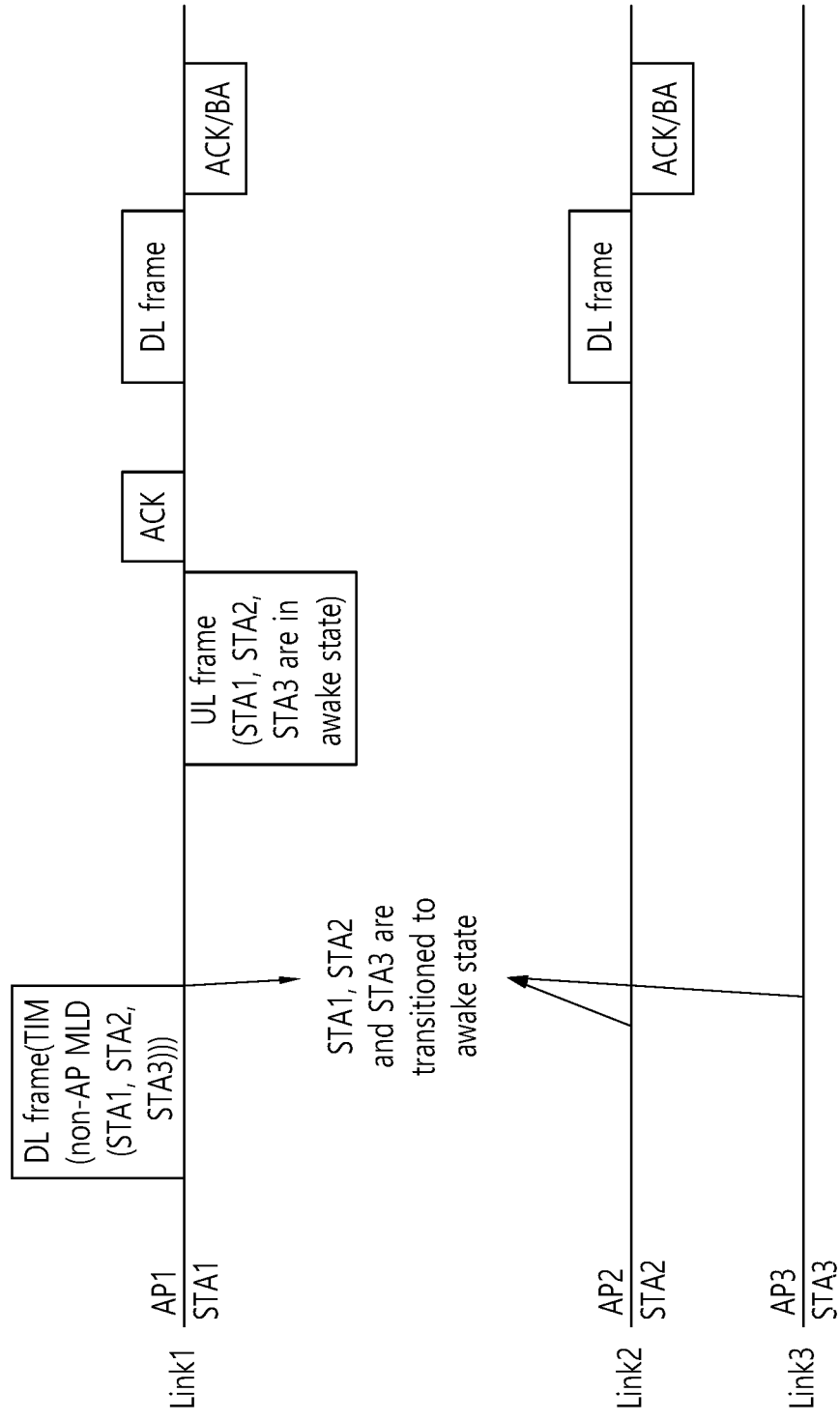
FIG. 21 to FIG. 25 illustrate an embodiment of a wakeup operation.

FIG. 21 illustrates an embodiment of a wakeup operation.

Referring to FIG. 21, APs 1, 2, and 3 may be present in an AP MLD, and STAs 1, 2, and 3 may be present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present in the STAs 1, 2, and 3. That is, even if corresponding buffer traffic is present in the STAs 1, 2, and 3, the AP (or AP MLD) may transmit a traffic indication to corresponding STAs in order to awaken some of the three STAs. The STAs 1, 2, and 3 of the non-AP MLD transition to the awake state, and when transmitting a UL frame, may inform the AP MLD (or AP) that the STAs 1, 2, and 3 are awakened. The AP may transmit a DL frame to two STAs (STA1, STA2) among them. Although the STA1 informs the AP1 of the awake state of the STAs 1, 2, and 3 in FIG. 21, it is obvious that each STA can inform each associated AP of the awake state thereof through a link thereof. For example, the STA1 may inform the AP1 of the awake state of the STA1 through a link1, the STA2 may inform the AP2 of the awake state of the STA2 through a link2, and the STA3 may inform the AP3 of the awake state of the STA3 through a link3. Descriptions thereon may be equally applied throughout the present specification.

Method 1: An AP MLD (or AP) provides a non-AP MLD (or non-AP STA) with at least one of a buffer status report for a corresponding non-AP MLD, a buffer status report for each STA in the non-AP MLD, and a buffer status report per TID in each STA of the non-AP MLD Buffer status report information of a terminal (e.g., non-AP MLD) to which the AP transfers buffer information may include at least one piece of information described below.

1) The total amount of the entire buffered traffic for the non-AP MLD (i.e., Queue size all of the non-AP MLD)
2) The total amount of buffered traffic for each STA in the non-AP MLD (i.e., Queue size all of each non-AP STA): that is, sum information of all queues for respective STAs
3) The amount of per-AC (access category, e.g., AC_VI, AC_VO, AC_BE, AC_BK) buffered traffic in each non-AP STA: that is, queue information corresponding to each AC is included in each STA
4) The amount of per-TID buffered traffic in each non-AP STA: that is, queue information corresponding to each TID is included in each STA
5) Report the amount of buffered traffic by distinguishing the received buffered traffic for STAs in the non-AP MLD according to an AC: that is, per-AC queue size information for a corresponding non-AP MLD is included
6) Report the amount of buffered traffic by distinguishing the received buffered traffic for STAs in the non-AP MLD according to a TID: that is, per-TID queue size (buffered traffic amount) information for a corresponding non-AP MLD is included In addition, buffer information to be transmitted by the AP MLD may include at least one piece of information (e.g., ACI Bitmap, Delta TID, ACI High, Scaling Factor, Queue Size High, Queue Size All, etc.) included in the existing buffer status report (BSR) control field.

Although the amount of the entire buffer traffic of the non-AP MLD is reported in the description of the present specification, it is obvious that one or more pieces of information listed above may be included in buffer status information for the non-AP MLD, transmitted by the AP.

When the non-AP MLD receives BSR information (i.e., at least one of BSR information of the aforementioned non-AP MLD, BSR information for each of STAs in the non-AP MLD, per-AC queue size information in each non-AP STA of the non-AP MLD, per-TID BSR information in each non-AP STA in the non-AP MLD, per-AC BSR information in the non-AP MLD, per-TID BSR information in the non-AP MLD) corresponding to the non-AP MLD from the AP MLD, the non-AP MLD may determine how many links (i.e., STAs mapped to the links) will be awakened based on the information. The non-AP MLD (or non-AP STA) may report to an associated AP MLD (or AP) about which STAs (or links corresponding to the STAs) have been awakened. The AP MLD (or AP) may transmit a DL frame through a corresponding link, based on information transmitted by a terminal (information on which non-AP STA in the non-AP has been awakened).

Figure 22:
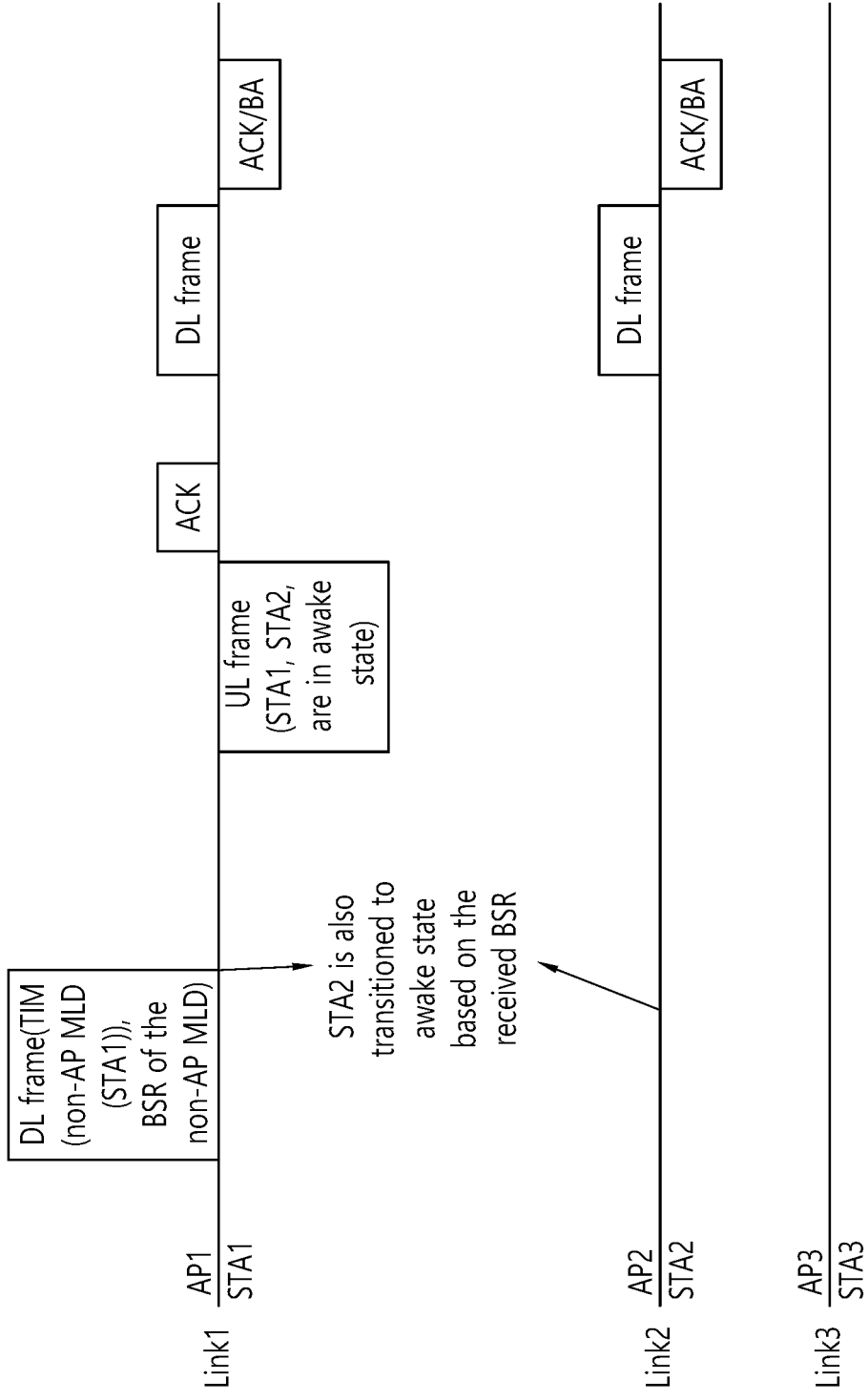

FIG. 22 illustrates an embodiment of a wakeup operation.

Referring to FIG. 22, APs 1, 2, and 3 may be present in an AP MLD, and STAs 1, 2, and 3 may be present in a non-AP MLD. The STAs 1, 2, and 3 of the non-AP are associated respectively with the APs 1, 2, and 3.

When transmitting a DL frame to the STA1 through a link1, the AP MLD (or AP1) may transmit to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (i.e., link2) may be awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) may transmit the DL frame to the STA1 and the STA2 through the link1 and the link2. The DL frame including the indication indicating the presence of the buffered traffic is preferably a beacon frame in the present specification, but is not limited thereto. Instead of transmitting to the STA1 a buffered traffic indication for the STA1, only a buffered traffic indication for the non-AP MLD of the STA1 may be included in a TIM, and a specific STA or the specific link may not be indicated. This may be equally applied throughout the present specification.

Detailed transmission method 1-1: The AP MLD (or AP STA) may perform transmission by including the buffer status report information defined above for the non-AP MLD (or non-AP STA) together in a corresponding frame (e.g., beacon frame) when transmitting a traffic indication map for a multi-link). The non-AP MLD (or non-AP STA) uses the buffer status report information included in the beacon frame to determine how many links (or STAs corresponding to the links) will be awakened among multiple links, and transmits a frame including information on the awake links/STAs to the AP to report this.

Figure 23:
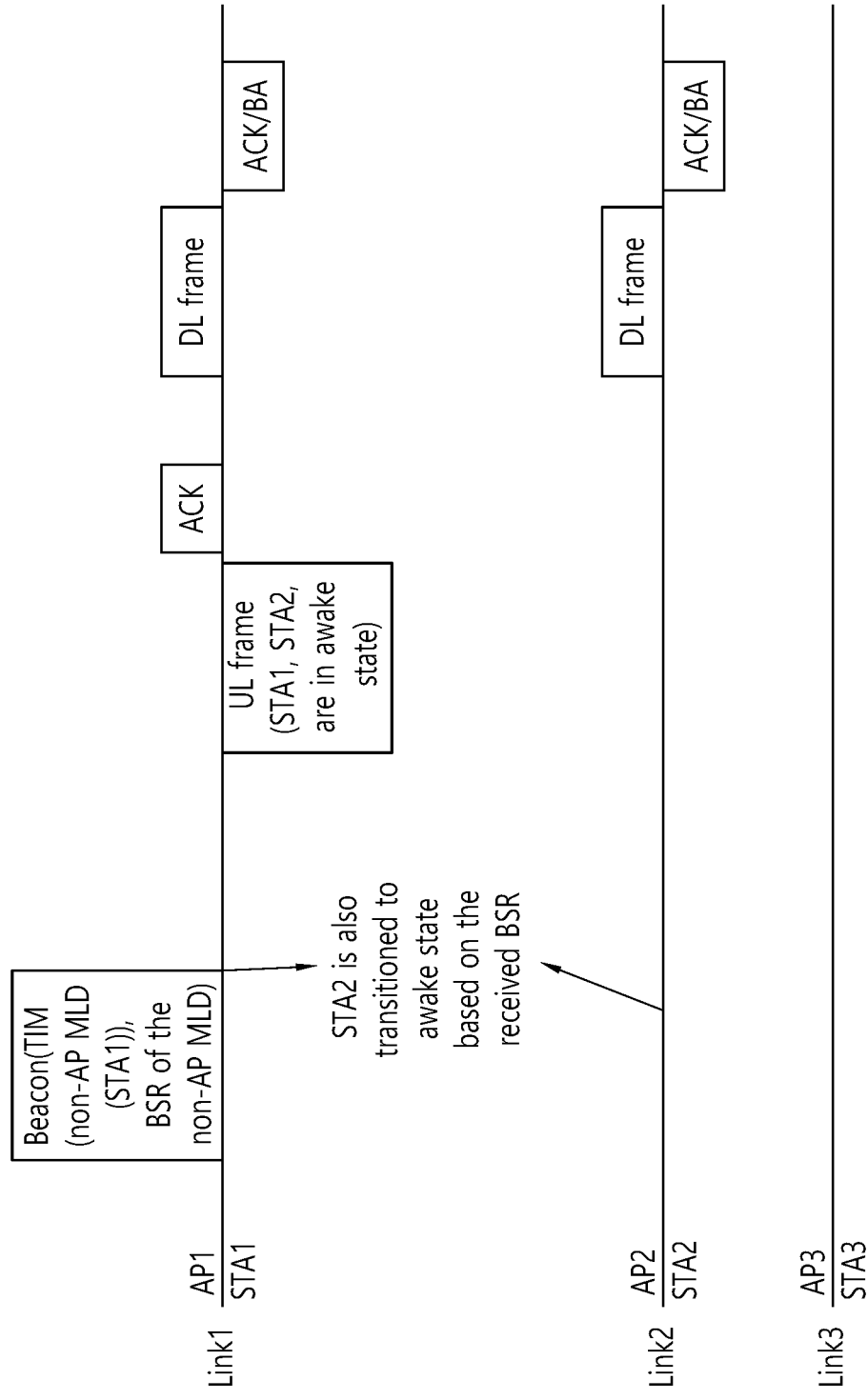

FIG. 23 illustrates an embodiment of a wakeup operation.

Referring to FIG. 23, APs 1, 2, and 3 may be present in an AP MLD, and STAs 1, 2, and 3 may be present in a non-AP MLD. The STAs 1, 2, and 3 of the non-AP are associated respectively with the APs 1, 2, and 3. It is assumed that all TIDs for the non-AP MLD are mapped to available links through default TID-to-link mapping.

When the AP1 transmits a beacon through the link1, buffered traffic information for other links/other STAs may be transmitted, and since TIDs are mapped to all available links, a TIM for awakening only a corresponding STA (e.g., STA1) is transmitted. Even if information for awakening only the STA1 is contained in the TIM, the non-AP MLD (or STA1) may also awaken an STA for another link since the TIDs are mapped to all links. For example, the non-AP MLD may additionally transition the STA2 to the awake state. The non-AP MLD may determine how many links will be additionally awakened, based on BSR information for the non-AP MLD, included in the received beacon frame. The non-AP STA1 may transmit to the AP1 a UL frame including information for recognizing a certain link for which STAs have transitioned to the awake state. For example, the non-AP STA1 may report to the AP MLD that the STA1 and the STA2 are in the awake state. Upon receiving a frame including information indicating that the STA1 and the STA2 are in the awake state, the AP MLD may transmit an immediate acknowledgment for a UL frame, and may transmit buffered traffic (e.g., a DL frame) to the STA1 and STA2.

Figure 24:
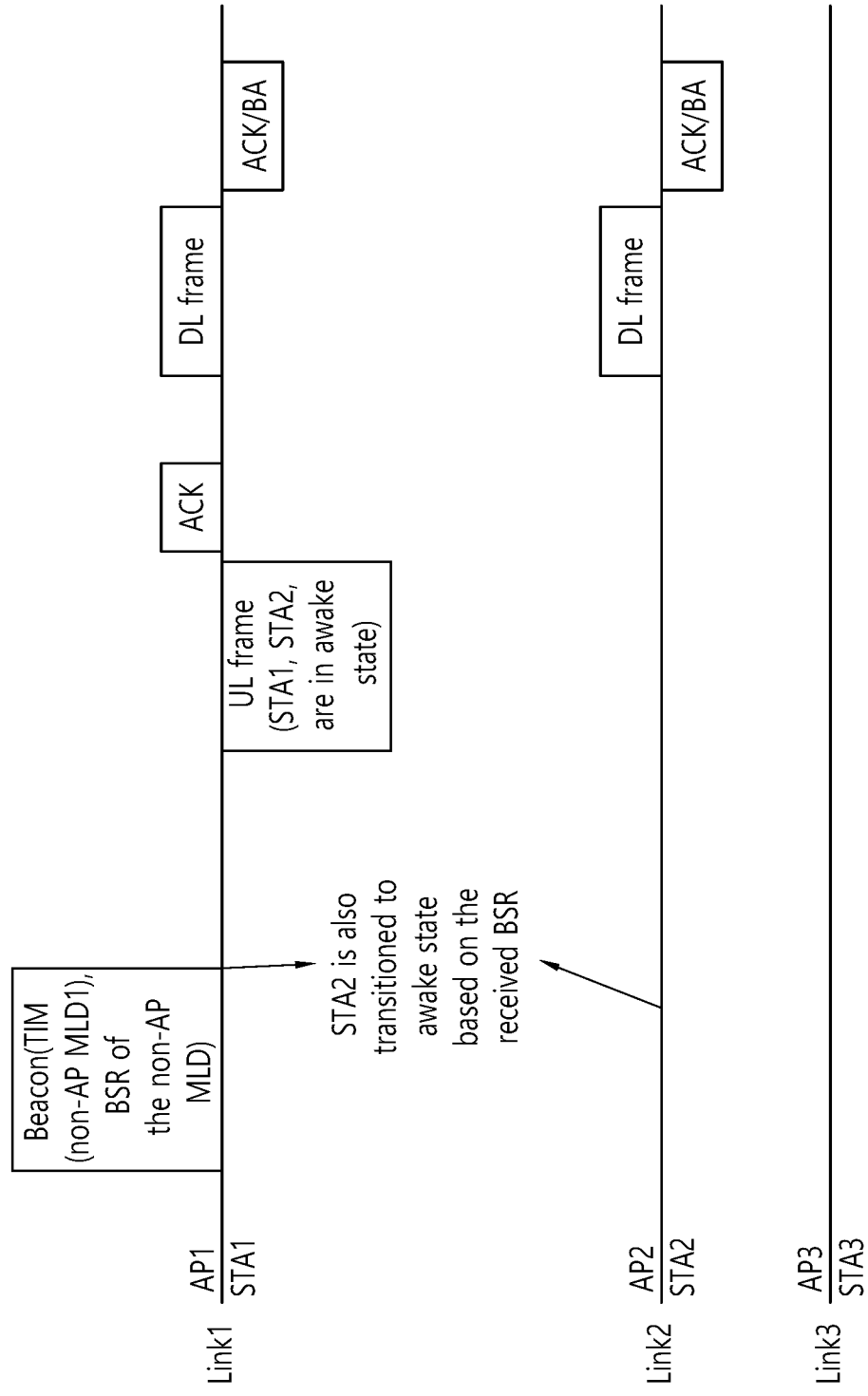

FIG. 24 illustrates an embodiment of a wakeup operation.

Referring to FIG. 24, APs 1, 2, and 3 may be present in an AP MLD1, and STAs 1, 2, and 3 may be present in a non-AP MLD1. The STAs 1, 2, and 3 of the non-AP are respectively associated with the APs 1, 2, and 3.

When the AP MLD1 (e.g., AP1) awakens the STAs through a TIM, information on the AP MLD1 may be included, instead of STA information. The STA1 may know that the non-AP MLD1 is an MLD to which the STA1 belongs, and the non-AP MLD1 may know that TIDs are mapped to multiple links (i.e., all available links). As shown in FIG. 24, the non-AP MLD1 may determine how many links will be additionally awakened, based on BSR information of the non-AP MLD, included in a beacon. For example, the non-AP MLD1 may awaken only the STA2 (the STA1 is already in an awake state, and the STA2 is transitioned to the awake state, so that the STAs 1 and 2 are in the awake state). The rest of the operation is the same as in the example of FIG. 23.

Figure 25:
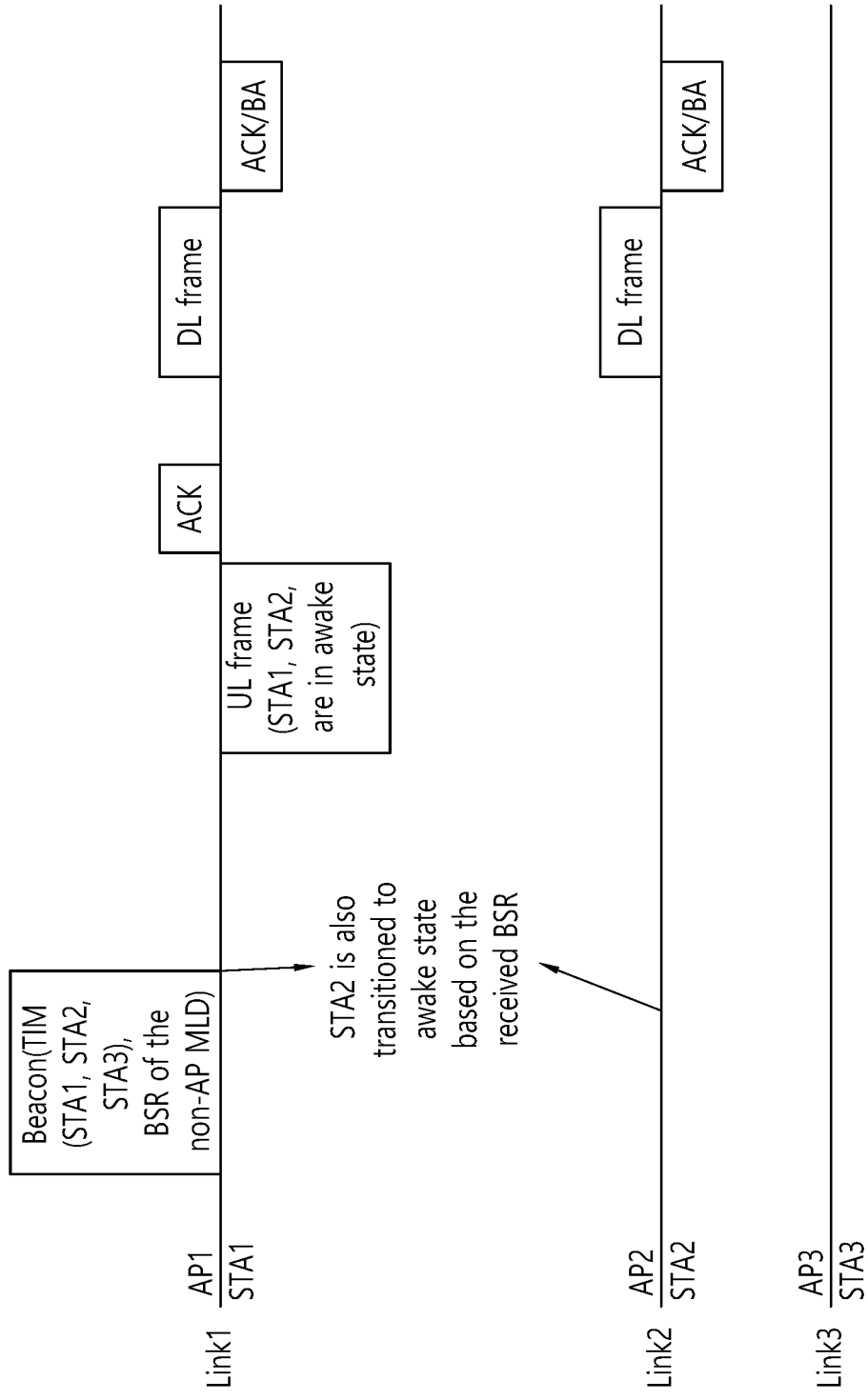

FIG. 25 illustrates an embodiment of a wakeup operation.

Referring to FIG. 25, APs 1, 2, and 3 may be present in an AP MLD1, and STAs 1, 2, and 3 may be present in a non-AP MLD1. The STAs 1, 2, and 3 are respectively associated with the APs 1, 2, and 3.

When a traffic indication is transmitted through a beacon frame, the AP MLD1 (or AP1) indicates STAs (STAs 1, 2, and 3) for all available links mapped to a TID. The non-AP MLD1 (or STA1) may determine how many links will be awakened based on BSR information for the non-AP MLD included in a beacon, even if corresponding information is received. For example, an example of additionally awakening the STA2 for a link2 is illustrated. The rest of operation is the same as in the example of FIG. 23.

Figure 26:
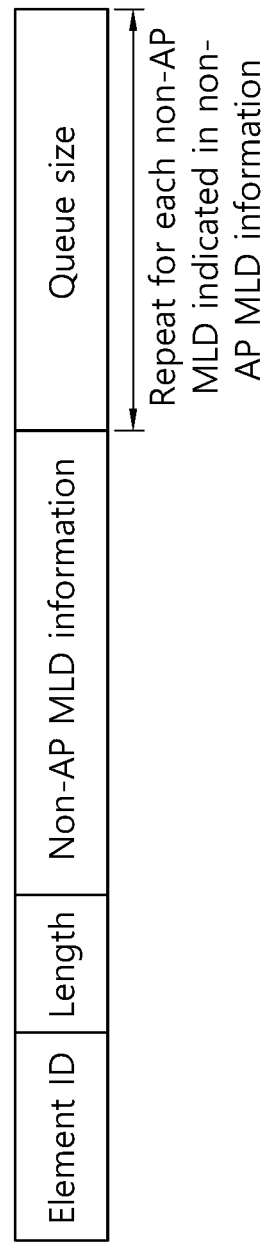
FIG. 26 illustrates an example of an ML-BSR element (for non-AP MLD).

FIG. 26 illustrates an example of an ML-BSR element (for non-AP MLD).

Referring to FIG. 26, the ML-BSR element may be an ML-BSR element including BSR information included in a beacon frame. Hereinafter, information included in the ML-BSR element is described.

Non-AP MLD information: indicates to which non-AP MLD the information is related. That is, the non-AP STA may know to which MLD the BSR information is related, by referring to non-AP MLD information.

Method A: It may consist of a field indicating the number of non-AP MLDs and an ID field indicating the non-AP MLD, and the non-AP MLD IDs as many as the number of non-AP MLDs may be included in the non-AP MLD information field.

Figure 27:
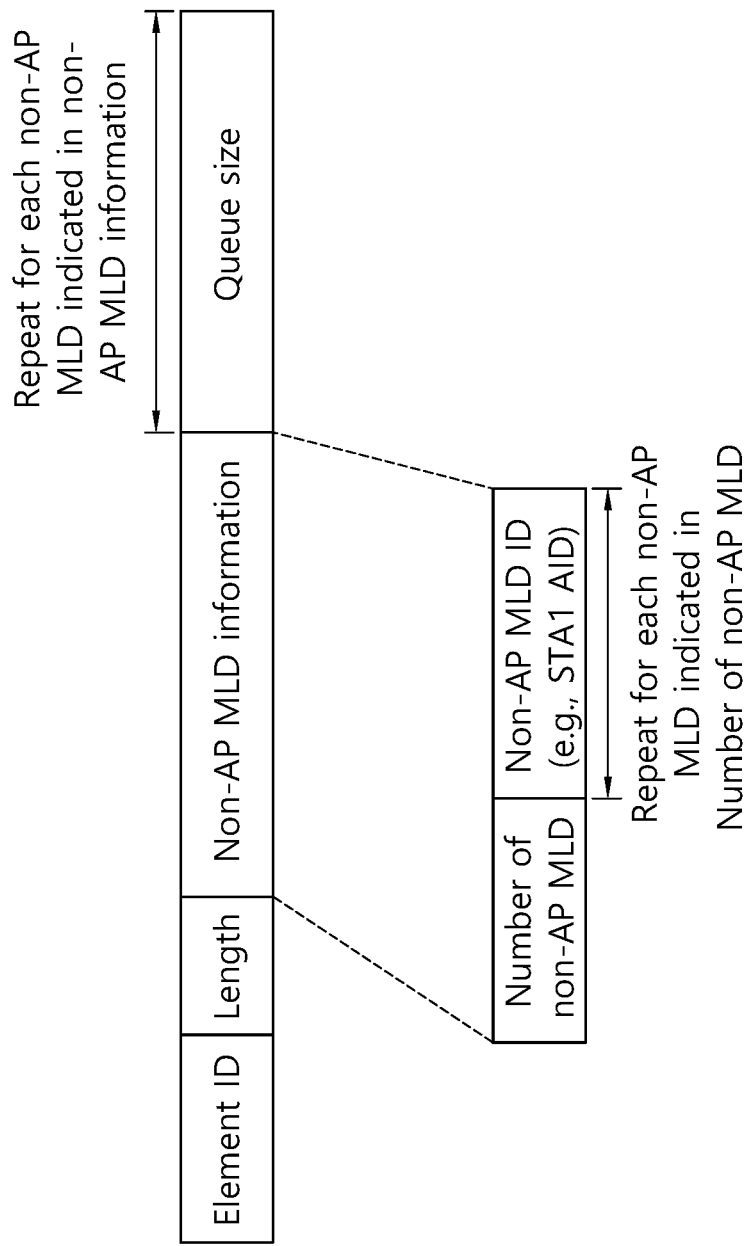
FIG. 27 illustrates an example of an ML-BSR element (method A).

FIG. 27 illustrates an example of an ML-BSR element (method A).

A non-AP MLD ID may be an AID of one STA belonging to a non-AP MLD. In this case, when STAs belonging to an MLD have different AIDs, the STAs belonging to the MLD shall know AIDs of different STAs in the same MLD. If the STAs belonging to the MLD have the same AID, there is no need to separately store the AIDs of the different STAs.

If the STAs have the same or different AIDs, a method for identifying this is additionally required.

Method B: Non-AP MLD information may be configured in a bitmap format, and bits may be mapped to respective non-AP MLDs. A queue size field for bits (MLDs) having a value of 1 may be included in a BSR element. In addition, bitmap size information may be included together.

When the same AID is allocated to STAs in the non-AP MLD, a non-AP MLD information bitmap may be constructed of bits which are set to 1 in a TIM bitmap (or multi-link (ML) TIM bitmap), and queue size information to be included correspond to the number of bits which are set to 1 in the non-AP MLD information bitmap. If the bitmap size information is included together, an MLD bitmap size is determined by a corresponding size, and a non-AP MLD (or non-AP STA) indicated by a first bit in the MLD bitmap is an MLD (or STA) corresponding to a first bit set to 1 in the TIM bitmap (or ML TIM bitmap), and a next bit is an MLD (or STA) corresponding to a second bit set to 1.

Figure 28:
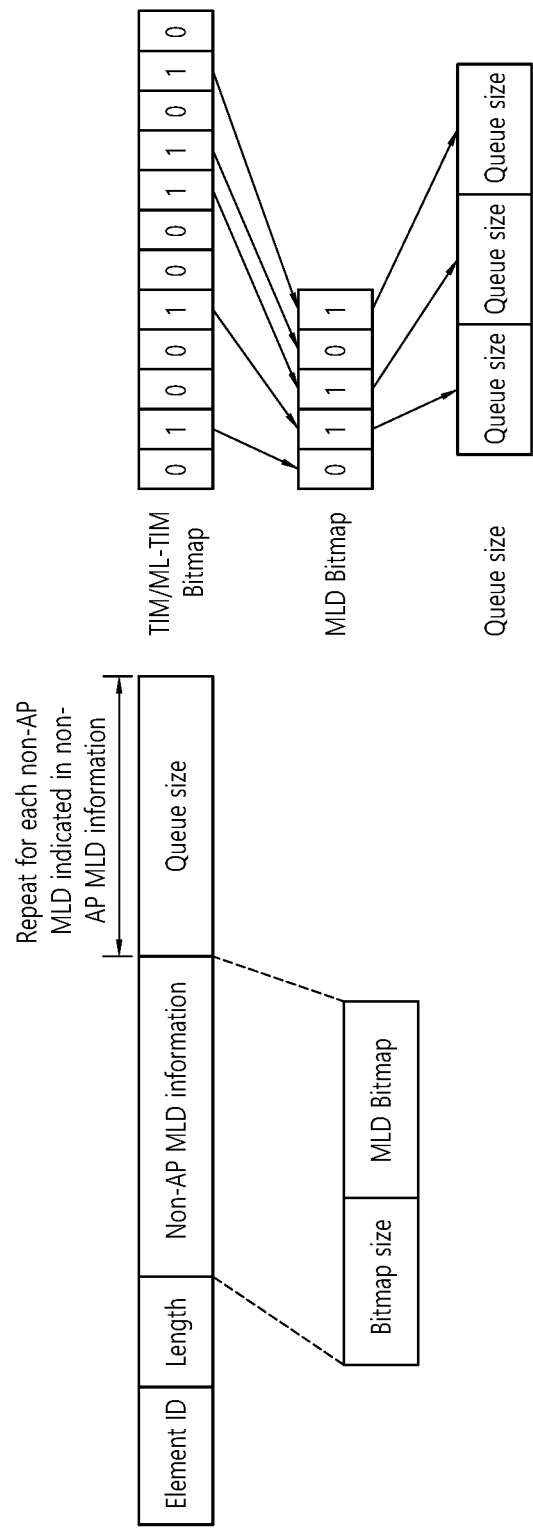
FIG. 28 illustrates an example of an ML-BSR element (method B).

FIG. 28 illustrates an example of an ML-BSR element (method B).

Referring to FIG. 28, a bitmap size may be optionally included. If the bitmap size is included, a size of an MLD bitmap may be determined based on a bitmap size value. As described above, a first bit of an MLD bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included may correspond to the number of bits which are set to 1 in the MLD bitmap (i.e., the number of MLDs/STAs).

If AIDs of STAs in a non-AP MLD always have different values, the STAs store (remember) AIDs of other STAs belonging to the same MLD. Therefore, when referring to an MLD bitmap, if a bit indicating another STA belonging to the same MLD is set to 1 even if it is not a bit corresponding to the STA, the STA may operate by regarding that it indicates an MLD of the STA. As described above, a size of the MLD bitmap may be determined by a size indicated by a bitmap size. As described above, a first bit of the MLD corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

If the AIDs of the STAs may be identical or different, a method for identifying this may be additionally required.

Queue size of non-AP MLD: Queue size information for each non-AP MLD indicated by non-AP MLD information is included, and a queue size is repeated as many as the number of indicated non-AP MLDs. That is, a total size of the queue size is determined as (the size of one Queue size*the number of non-AP MLDs).

FIG. 29 illustrates an example of an ML-BSR element (for non-AP MLD).

Referring to FIG. 29, the ML-BSR element may be an ML-BSR element including BSR information included in a beacon frame. Hereinafter, information included in the ML-BSR element is described.

Non-AP STA information: indicates which non-AP STAs are included. That is, the non-AP STA may know which non-AP STA is indicated and whether a queue size for this is included, by referring to the non-AP TA information.

Method C: It may consist of a field indicating the number of non-AP MLDs and an ID field indicating the non-AP MLD, and the non-AP MLD IDs as many as the number of non-AP MLDs is included.

Figure 30:
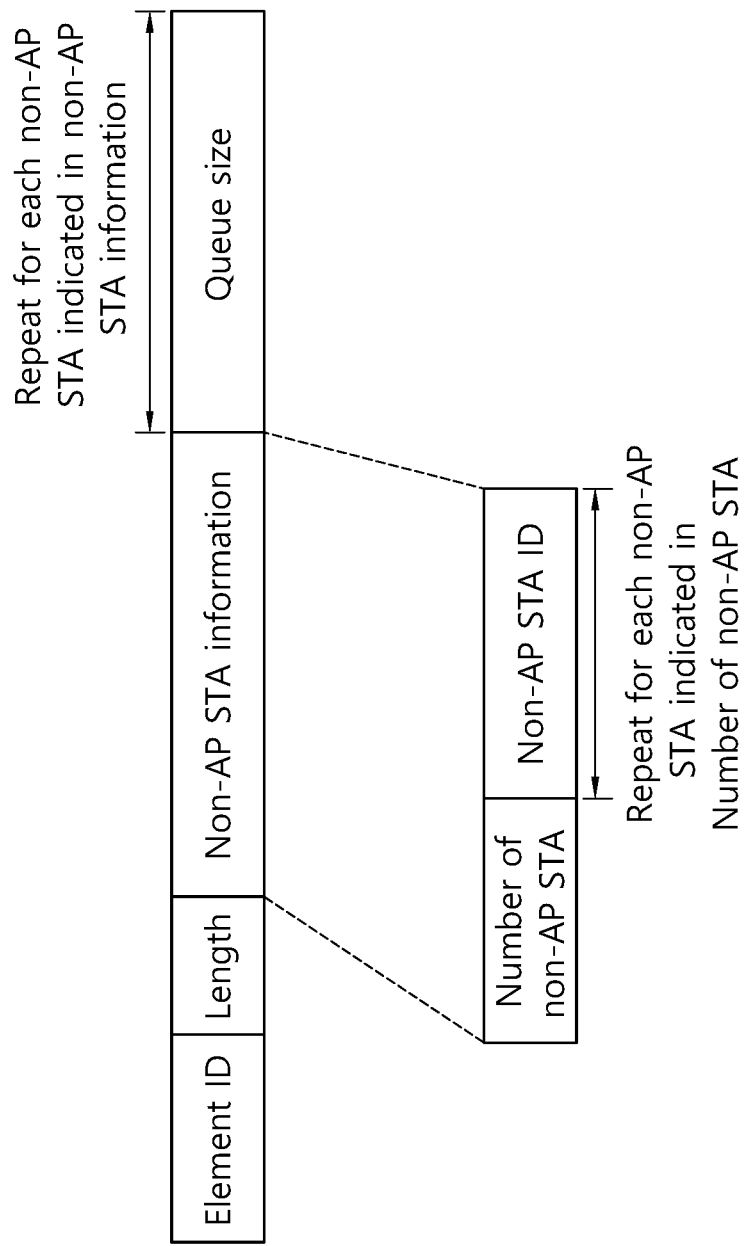
FIG. 30 illustrates an example of an ML-BSR element (method C).

FIG. 30 illustrates an example of an ML-BSR element (method C).

When different AIDs are always allocated to STAs in a non-AP MLD (e.g., unique AIDs are allocated to STAs in the MLD in one AID space), the number of non-AP STA IDs to be included may be the same as the number of non-AP STAs which shall include a queue size.

When the same AID is allocated to the STAs in the non-AP MLD, a method for identifying this is required.

For example, non-AP STA ID information may include a non-AP STA ID and link information (e.g., link ID) to identify the STAs in the MLD.

Method D: Non-AP STA information may be configured in a bitmap format, and bits may be mapped to respective non-AP STAs. A queue size field for bits (i.e., STAs) having a value of 1 may be included. In addition, bitmap size information may be included together.

When the STAs in the non-AP MLD always have different values and it is possible to indicate all STAs in the non-AP MLD, terminals set to 1 in a TIM bitmap are constructed of terminals of non-AP STA information. In the presence of bitmap size information, a size of a non-AP STA bitmap is determined by a size indicated in a size field, and in the absence of the bitmap size information, the size of the non-AP STA bitmap is determined by the number of bits set to 1 in the TIM bitmap (or ML-TIM bitmap). Therefore, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

Figure 31:
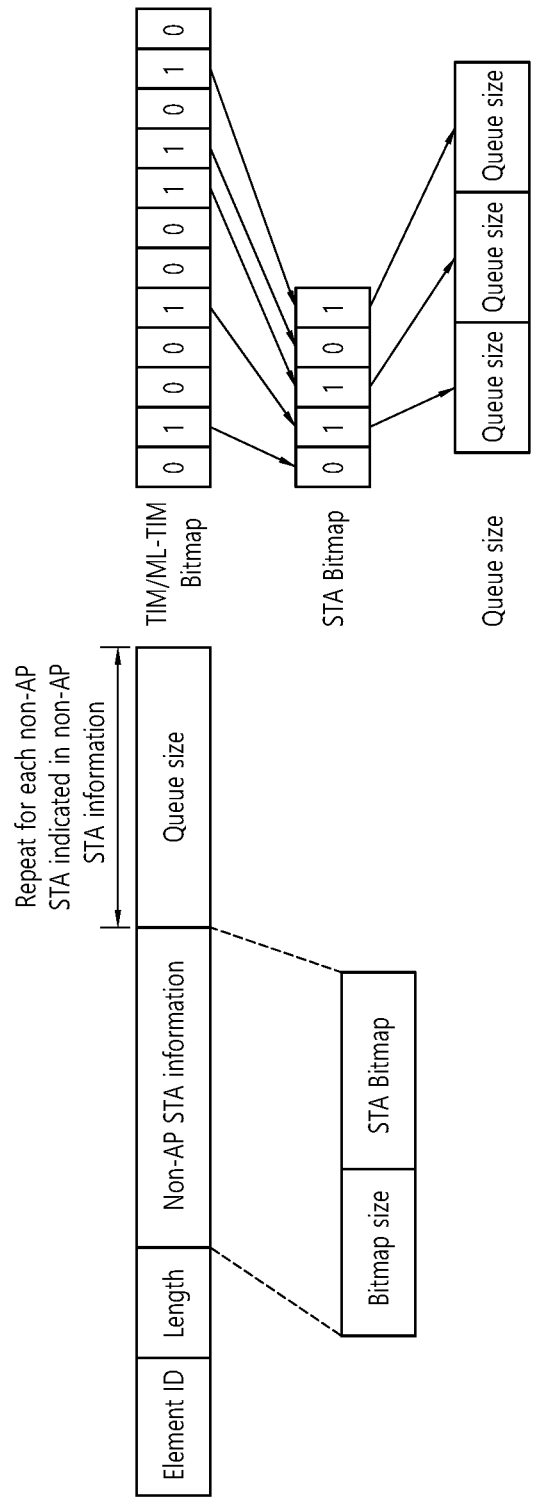
FIG. 31 illustrates an example of an ML-BSR element (method D).

FIG. 31 illustrates an example of an ML-BSR element (method D).

In the example above, the bitmap size may be optionally included. If the bitmap size is included, a size of an MLD bitmap may be determined based on a bitmap size value. As described above, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included corresponds to the number of bits which are set to 1 in the MLD bitmap (i.e., the number of MLDs/STAs).

Queue size of non-AP STA: Queue size information for each non-AP STA indicated by non-AP STA information is included, and a queue size is repeated as many as the number of indicated non-AP STAs. That is, a total size of the queue size is determined as (the size of one Queue size*the number of non-AP STAs).

Method 2: Upon receiving traffic for a TID with default TID-to-link mapping (i.e., the TID is mapped to all available links), an AP transmits traffic indication information only for STAs corresponding to links for one or more links among all available links. A non-AP MLD awakens a corresponding terminal, based on information indicated by the traffic indication information, and transmits to an AP MLD/AP a frame including information on the awakened STAs to report which terminal is awake.

Figure 32:
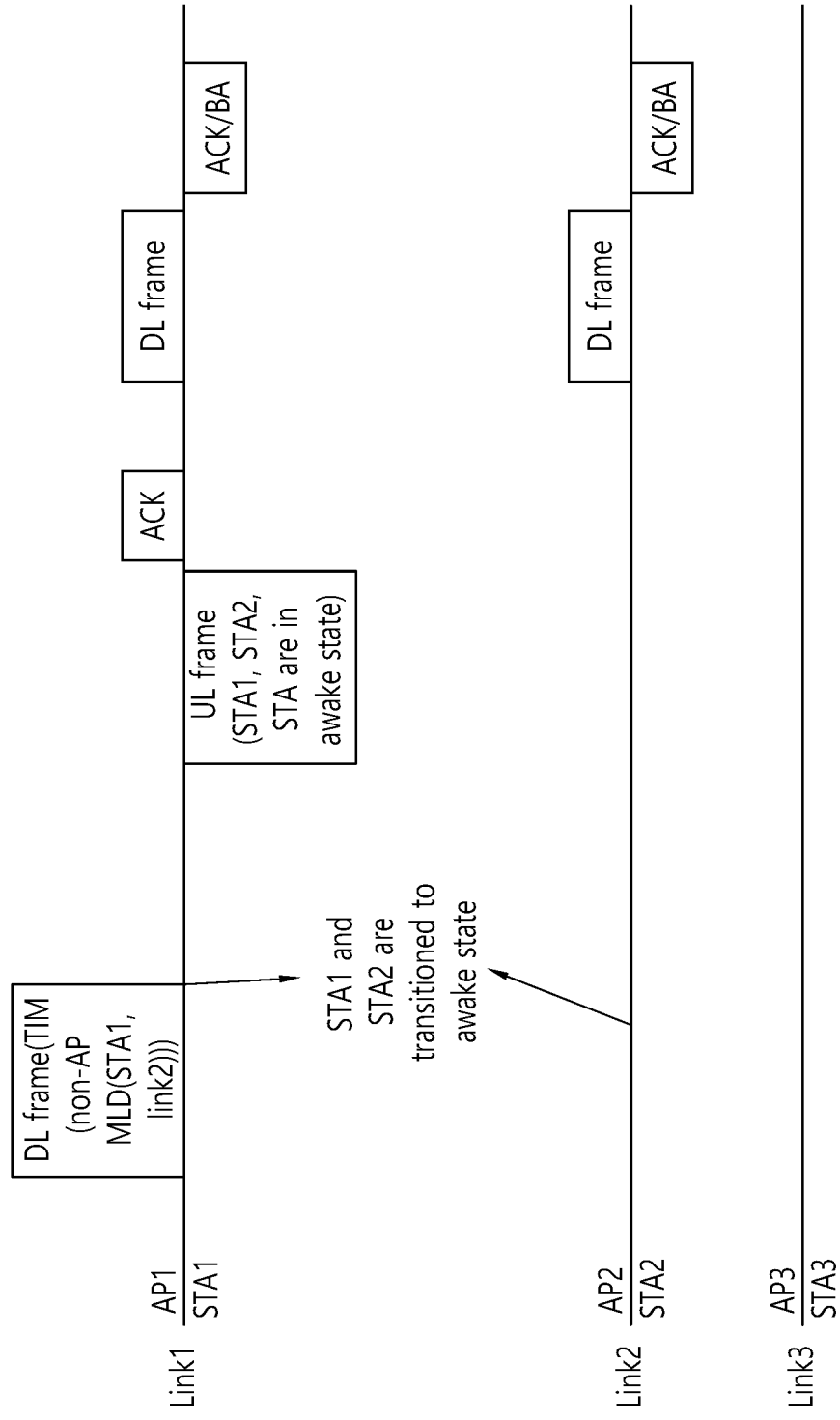
FIG. 32 to FIG. 35 illustrate an embodiment of a wakeup operation.

FIG. 32 illustrates an embodiment of a wakeup operation.

Referring to FIG. 32, APs 1, 2, and 3 are present in an AP MLD, and STAs 1, 2, and 3 are present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present only in the STA1 and the STA2 among the STAs 1, 2, and 3. That is, even if corresponding buffer traffic is present in the STAs 1, 2, and 3, the AP (or AP MLD) may transmit a traffic indication to corresponding STAs in order to awaken some of the three STAs.

For example, when transmitting a DL frame to the STA1 through the link1, the AP MLD (i.e., AP1) may transmit information for transitioning the STA2 (i.e., indicating that the STA2 also has buffered traffic) to an awake state to the STA1 (or a non-AP MLD of the STA1) together with an indication indicating a presence of buffered traffic. The non-AP MLD may transition the STA1 and the STA2 (link2) to the awake state, based on information received from the AP, and when transmitting a UL frame to the AP (or AP MLD), may perform transmission by including information indicating that the STA1 and the STA2 are awakened (i.e., information indicating that it is ready to receive the DL frame). The AP (or AP MLD) may transmit the DL frame to the STA1 and the STA2 through the link1 and the link2.

Returning to FIG. 22, when transmitting the DL frame to the STA1 through the link1, the AP MLD (or AP1) transmits to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (link2) is awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) transmits the DL frame to the STA1 and the STA2 through the link1 and the link2.

Detailed transmission method: The AP MLD (or AP STA) performs transmission by including the buffer status report information defined above for the non-AP MLD (or non-AP STA) together in a corresponding frame (e.g., a DL data frame) when transmitting an individually address (e.g., unicast) frame to a terminal in an awake state. The non-AP MLD (or non-AP STA) uses the buffer status report information included in the DL frame to determine whether to transition some links (or STAs corresponding to the links) to the awake state among multiple links, and transmits an uplink frame including information on the awake links/STAs to the AP to report this.

Figure 33:
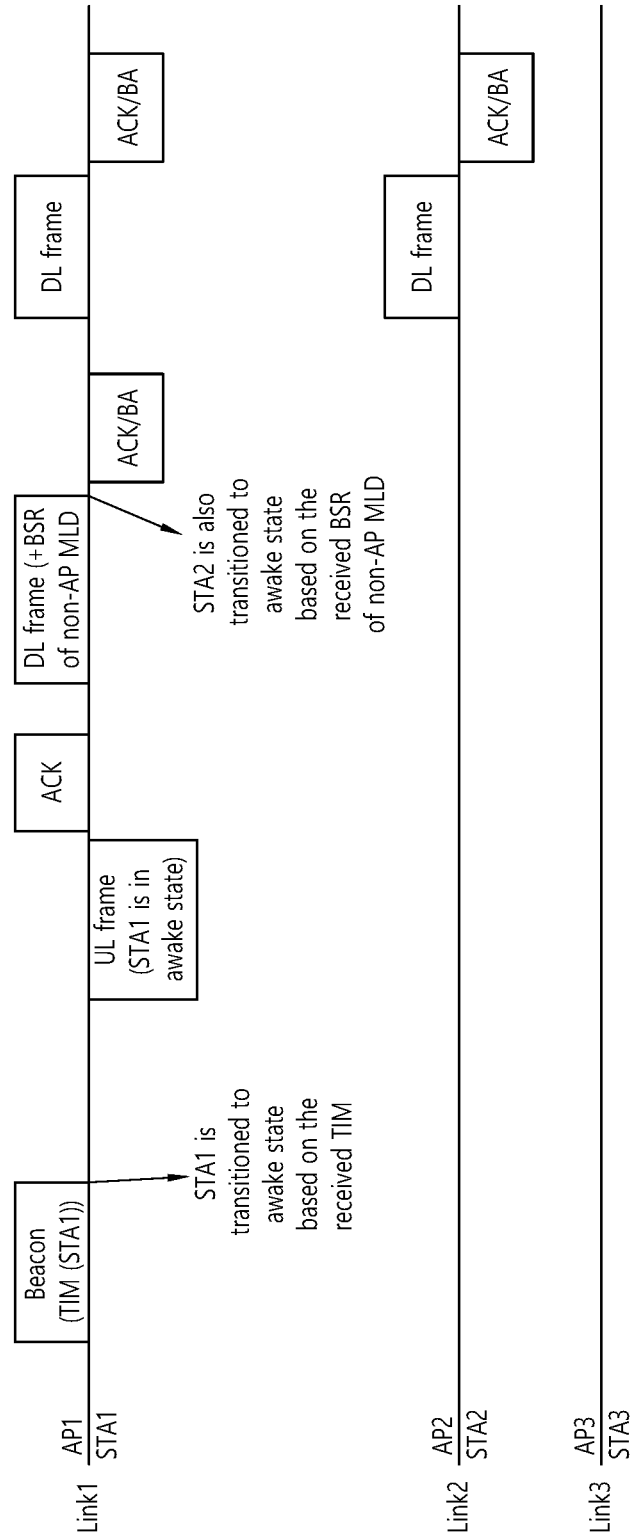

FIG. 33 illustrates an embodiment of a wakeup operation.

Referring to FIG. 33, APs 1, 2, and 3 are present in an AP MLD, and STAs 1, 2, and 3 are present in a non-AP MLD. The STAs 1, 2, and 3 are associated respectively with the APs 1, 2, and 3. It is assumed that all TID(s) for the non-AP MLD are mapped to available links through default TID-to-link mapping.

For example, when the AP1 transmits a beacon through the link1, buffered traffic information for other links/other STAs may be transmitted. Since TIDs are mapped to all available links, the AP MLD may transmit a beacon frame including a TIM for awakening only a corresponding STA (e.g., STA1). Even if information for awakening only the STA1 is contained in the TIM, and even if the TIDs are mapped to all links, the non-AP MLD (or STA1) transitions the STA1 to the awake state. Thereafter, the STA1 may transmit to the AP a UL frame (e.g., PS-poll or QoS null) for reporting that the STA1 is awakened, and may receive an Ack frame in response thereto. When the AP1 transmits a DL frame to the STA1, buffer status information (e.g., BSR or queue size) for a non-AP MLD corresponding to the STA1 may be included and transmitted. When the STA1 receives the DL frame, how many available links thereof will be awakened may be determined upon receiving BSR information for the non-AP MLD. Although only the BSR information for the non-AP MLD is mentioned to describe embodiments of the present specification, it may be replaced with including one or more of various types of BSRs (e.g., BSR information for each STA in the non-AP MLD, or BSR information for each of ACs (or TIDs) of the non-AP MLD).

FIG. 33 illustrates an example of transitioning the STA2 for the link2 from the doze state to the awake state. This example shows that the STA1 receives a DL frame and then transmits ACK/BA to the AP1 in response thereto. A subsequent operation of the STA (non-AP MLD) and the AP (/AP MLD) may perform one or more of the following operations.

1) The AP1 (or AP MLD) which has received a response frame (ACK/BA) for DL frame transmission including BSR for the non-AP MLD may transmit a DL frame also through another link (link 2). However, there is a problem in that whether the STA2 is awakened cannot be guaranteed.

2) When the non-AP STA (STA1) receives the BSR for the non-AP MLD, links to be awakened (or STAs to be mapped to the links) are determined based on BSR information, and information of the awakened STA is included and transmitted when a UL frame is transmitted. The AP may transmit a DL frame through multiple links, based on information of an awakened terminal, included in the UL frame.

Figure 34:
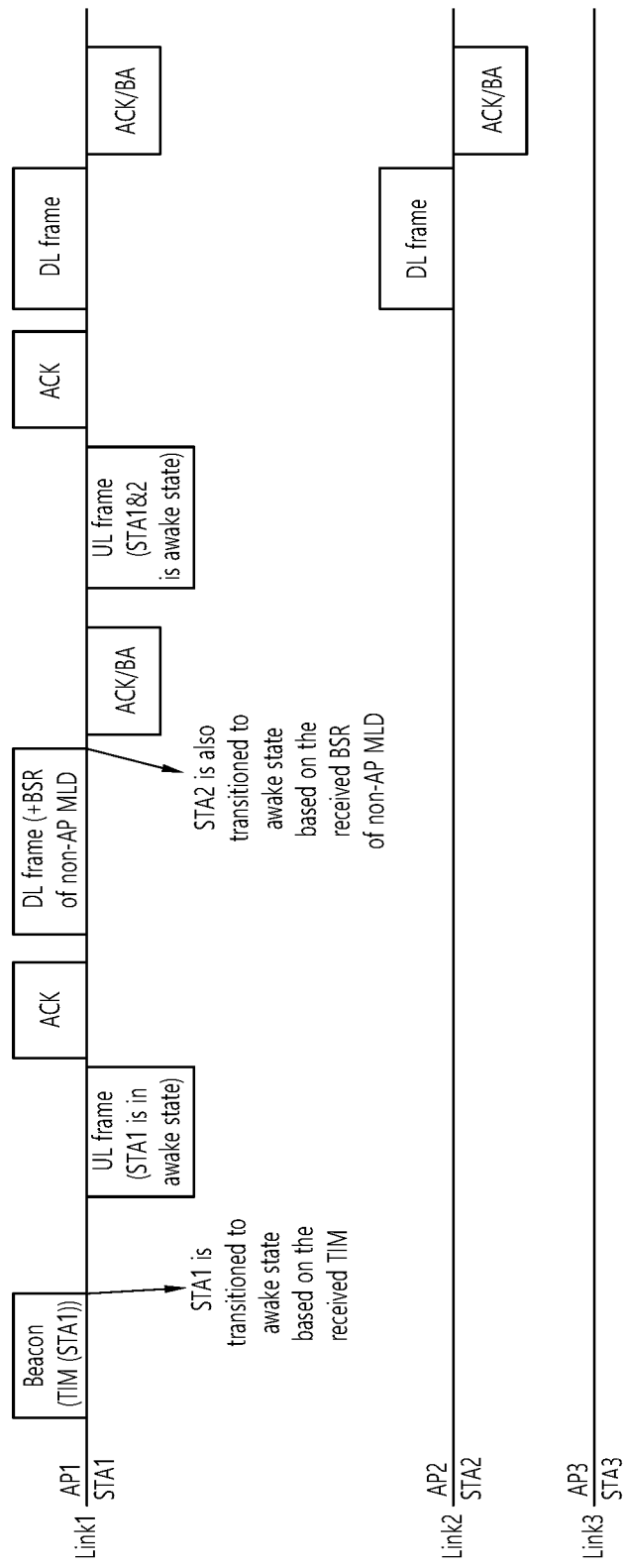

FIG. 34 illustrates an embodiment of a wakeup operation.

Referring to FIG. 34, APs 1, 2, and 3 are present in an AP MLD, and STAs 1, 2, and 3 are present in a non-AP MLD. The STAs 1, 2, and 3 are respectively associated with the APs 1, 2, and 3.

The STA1 may determine to additionally transition the STA2 (link2) to an awake state, based on BSR information for the non-AP MLD included in a first DL frame. After the STA2 is awakened, in order to report that the STA2 is awakened, information thereon is transmitted by being included in a UL frame when the STA1 transmits the UL frame. Thereafter, the AP MLD may transmit the DL frame to the non-AP MLD by using the link 1 and the link 2.

Instead of reporting by the STA1 to the AP MLD (or AP1) that "the STA2 has transitioned to the awake state", the STA2 may report through the link 2 that the STA2 has transitioned to the awake state. An example thereof is described below with reference to FIG. 35.

Figure 35:
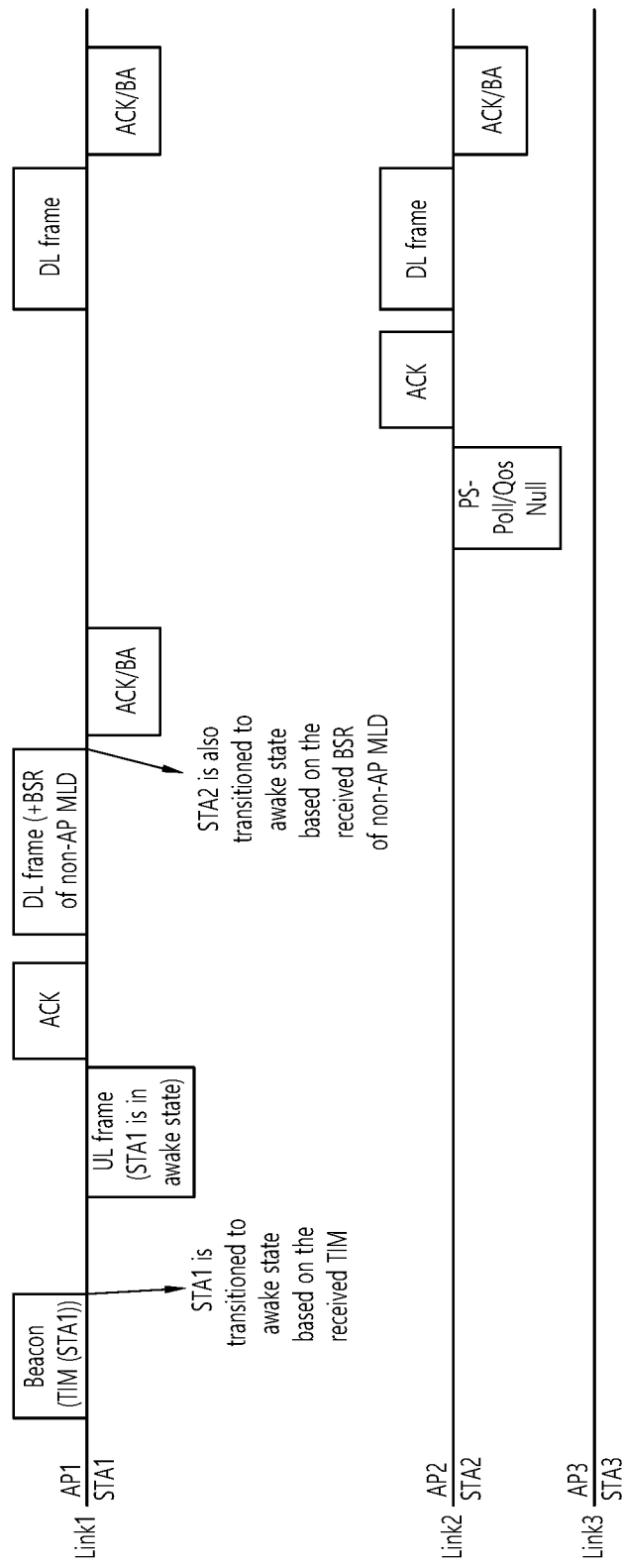

FIG. 35 illustrates an embodiment of a wakeup operation.

Referring to FIG. 35, APs 1, 2, and 3 are present in an AP MLD, and STAs 1, 2, and 3 are present in a non-AP MLD. The STAs 1, 2, and 3 are respectively associated with the APs 1, 2, and 3.

The STA1 (or non-AP MLD) may determine to additionally transition the STA2 (link2) to an awake state, based on BSR information for the non-AP MLD included in a first DL frame. After the STA2 is awakened, in order to report that the STA2 is awakened, the STA2 may transmit a UL frame through the link2. The AP MLD which has received the UL frame (e.g., PS-poll/QoS null frame) from the STA2 through the link2 may know that the STA2 has been awakened, and may transmit the DL frame to the non-AP MLD by using the link1 and the link 2.

A method of transmitting information (e.g., BSR information) related to data to be transmitted by the AP MLD to the STA MLD may be roughly classified into two types as follows.

1. A method in which the information (e.g., BSR information) related to the data to be transmitted by the AP MLD to the STA MLD is included in a beacon frame (the method of FIG. 21 to FIG. 32).

2. A method in which only a TIM related to data to be transmitted by the AP MLD to the STA MLD is transmitted through a beacon frame, and the information (e.g., BSR information) related to the data to be transmitted by the AP MLD to the STA MLD is transmitted through a subsequent DL frame (e.g., a data frame) (the method of FIG. 33 to FIG. 35)

The AP MLD may use both of the two methods. For example, the AP MLD may determine how to transmit BSR information to the STA MLD according to a type of traffic, i.e., AC (or TID). For example, the AP MLD may transmit the BSR information to the STA MLD through the first method (or second method) upon receiving traffic of an AC requiring low latency, and may transmit the BSR information to the STA MLD through the second (or first method) upon receiving traffic of an AC not requiring relatively low latency.

Herein, the AC requiring low latency may be a new AC defined additionally for low-latency transmission, or may be traffic requiring relatively low latency among the existing ACs such as AC_VO, AC_VI, or the like. The AC requiring low latency may vary depending on a situation, and is not limited thereto.

The BSR information of the non-AP MLD, included in the DL frame, may be configured using the following methods.

For example, the BSR information of the non-AP MLD may be included in an HT control field.

FIG. 36 illustrates an embodiment of an HT control field.

Referring to FIG. 36, when B0 and B1 of the HT control field are both set to 1 so as to be an HE variable HT control field, the remaining bits may be constructed of an A-Control subfield.

Figure 37:
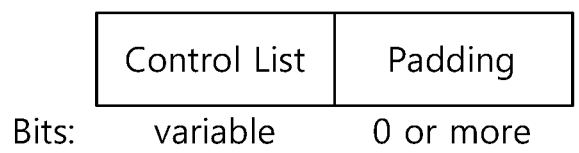
FIG. 37 illustrates an embodiment of an A-Control subfield.

FIG. 37 illustrates an embodiment of an A-Control subfield.

Referring to FIG. 37, the A-Control subfield may have a length of 30 bits, and a control list subfield may include one or more control subfields.

Figure 38:
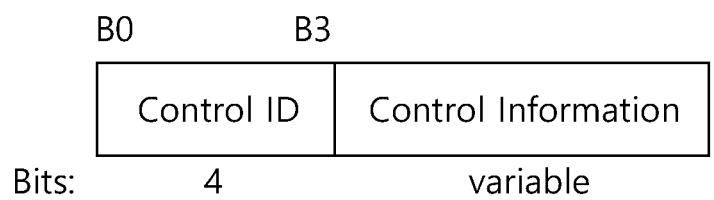
FIG. 38 illustrates an embodiment of a control subfield format.

FIG. 38 illustrates an embodiment of a control subfield format.

Referring to FIG. 38, a control ID subfield indicates a type of information to be transmitted in a control information subfield, and a length of the control information subfield is fixed for each value of the control ID subfield Different control information may be configured according to a value of a control ID.

BSR information of a non-AP MLD may be defined with one new control subfield.

Figure 39:
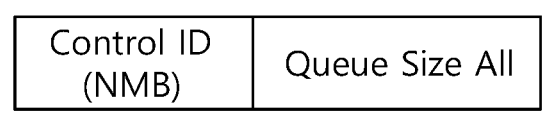

FIG. 39 illustrates an example of a non-AP MLD BSR (NMB) control subfield.

Referring to FIG. 39, a control ID may indicate the NMB, and a queue size may indicate total queue size information of a non-AP MLD to which a corresponding STA (an STA indicated by a receiver address) belongs.

The queue size information may extend an additional queue size by using a scaling factor as shown in FIG. 40.

FIG. 40 illustrates an embodiment of an NMB control subfield.

Referring to FIG. 40, a control ID may include at least one of a TID, an STA ID, and a link ID. Table 8 shows an example of scaling factor subfield encoding.

TABLE 8

| Scaling Factor subfield | Scaling factor, SF, in octets |
|---|---|
| 0 | 16 |
| 1 | 256 |
| 2 | 2048 |
| 3 | 32768 |

Referring to Table 8, the Scaling Factor subfield may indicate the unit (SF), in octets, of the Queue size subfield. In association with an SF value of the Scaling Factor subfield, a Queue size may be used to indicate a total size of all MSDUs and A-MSDUs buffered for a corresponding non-AP MLD by the AP. When a value of the Queue size subfield is A and the Scaling Factor subfield is 1, this indicates that the total size of all MSDUs and A-MSDUs buffered for the non-AP MLD by the AP is about A*256 octets, which may be known to the non-AP MLD (or STA).

The AP-MLD (or AP) may perform transmission by including one or more pieces of information listed below, as well as reporting of the entire buffered information of the non-AP MLD.

ACI (Access Category Indication) information (e.g., 4 bits size): Information indicating an access category (AC) (e.g., AC_VO, AC_VI, AC_BE, AC_BK) of which an BSR is indicated by corresponding BSR information. When it is included in a bitmap format, bits are mapped to respective ACs, and indicate that traffic is present for an AC set to 1.

Figure 41:
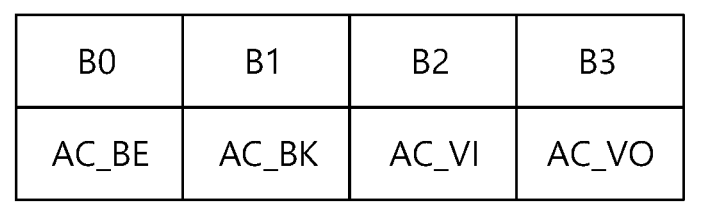

FIG. 41 illustrates an example of ACI bitmap subfield encoding.

Delta TID (e.g., 2 bits size): indicates the number of TIDs for which a buffer status is reported, together with an ACI bitmap subfield. Table 9 shows an example of delta TID subfield encoding.

TABLE 9

| Number of bits in the ACI Bitmap subfield that are set to 1 | Mapping of Delta TID subfield value and number of TIDS, $N_{TID}$ |
|---|---|
| 0 | Values 0 to 2 are not applicable; Value 3 indicates 8 TIDs (i.e., all ACs have traffic) |
| 1 | Value 0 indicates 1 TID; Value 1 indicates 2 TIDs; Values 2 to 3 are not applicable: |
| 2 | Value 0 indicates 2 TID: Value 1 indicates 3 TIDs; Value 2 indicates 4 TIDs; Value 3 is not applicable: |
| 3 | Value 0 indicates 3 TID; Value 1 indicates 4 TIDs; Value 2 indicates 5 TIDs: Value 3 indicates 6 TIDs; |
| 4 | Value 0 indicates 4 TID: Value 1 indicates 5 TIDs; Value 2 indicates 6 TIDs; Value 3 indicates 7 TIDs; |

NOTE 1
The number of TIDs can be obtained as $N_{TID} = N_{ones} + D_{Val}$, where $N_{ones}$ is the number of bits set to one in the AC Bitmap subfield, and $D_{Val}$ is the value of the Delta TID subfield except if $N_{ones}$ is equal to 0 for which there is the $N_{TID} = 8$ case.
NOTE 2
The Delta TID might be used by an AP to determine the setting of the TID Aggregation Limit field in the User Info field addressed to the STA in a subsequent Basic Trigger frame.

ACI High subfield (e.g., 2 bits size): used together with a queue size high subfield, and indicates ACI of an AC for which a BSR is indicated in a queue size high subfield. An example of ACI to AC coding is shown in the table below.

Queue Size High subfield (e.g., 8 bits size): indicates an amount of buffered traffic for an AC indicated by the ACI High subfield, by using an SF unit.

The Queue Size All subfield: indicates an amount of buffered traffic for all ACs indicated by the ACI Bitmap subfield, in units of SF octets of the Scaling Factor subfield.

In addition, a value of 254 in the Queue Size High and Queue Size All subfields indicates that the amount of buffered traffic is greater than 254×SF octets, and a value of 255 in the Queue Size High and Queue Size All subfields indicates that the amount of buffered traffic is an unspecified or unknown.

FIG. 42 illustrates an example of an NMB control subfield including every information described above.

As described above, a value indicated by a scaling factor is applied to both Queue Size High and Queue Size All. ACI Bitmap and Delta TID values are applied to Queue Size All. ACI High is applied to Queue Size High.

It is exemplified that an AP (or AP MLD) newly defines and uses a control subfield to report a BSR of a specific non-AP MLD. Hereinafter, a method of using the existing BSR control subfield is described.

FIG. 43 illustrates an example of a BSR control subfield in an 11ax system.

Referring to FIG. 43, the BSR control subfield is an HT control field used when a terminal transmits a buffer status thereof to an AP. For a simple definition in the present specification, when an AP MLD transfers to a corresponding non-AP STA an amount of buffered traffic for a specific non-AP MLD in a BSR thereof, the existing BSR control subfield may be used. However, to use this, the BSR transmitted by the AP needs to be redefined to indicate not a buffer status of a specific non-AP STA (i.e., an STA indicated by a receiver address of a frame including the BSR control field) but an amount of traffic to be transmitted to a non-AP MLD to which the non-AP STA belongs. In this case, there may be a constraint in that the BSR information for the specific non-AP STA cannot be transferred.

That is, when the AP transmits the BSR control field, information included in the BSR control field indicates BSR information of an MLD to which the STA indicated by the receiver address of the frame including the BSR control field belongs.

If an address is set to a broadcast address, the AP indicates TID count information and AC information related to queue size information for high AC and a total buffered traffic amount of the AP.

Figure 44:
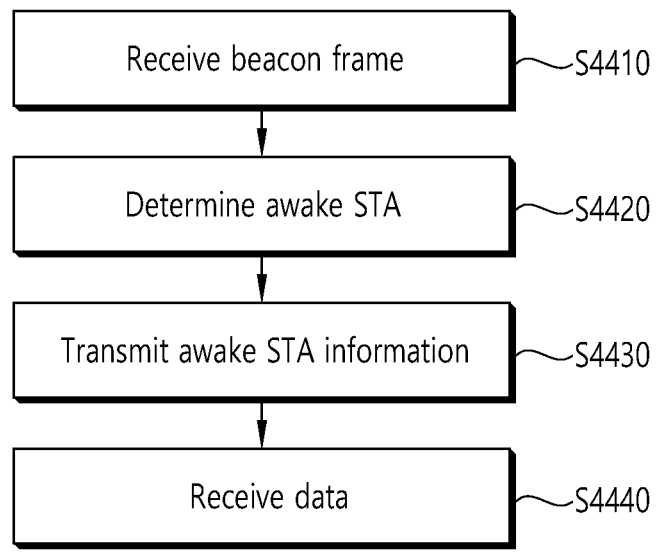
FIG. 44 illustrates an embodiment of a method of operating an STA MLD.

The information defined above may be transmitted by being defined in different formats described below.
1) The amount of per-AC (access category, e.g., AC_VI, AC_VO, AC_BE, AC_BK) buffered traffic in each non-AP STA: that is, queue information corresponding to each AC is included in each STA
2) The amount of per-TID buffered traffic in each non-AP STA: that is, queue information corresponding to each TID is included in each STA
3) Report the amount of buffered traffic by distinguishing the received buffered traffic for STAs in the non-AP MLD according to an AC: that is, per-AC queue size information for a corresponding non-AP MLD is included
4) Report the amount of buffered traffic by distinguishing the received buffered traffic for STAs in the non-AP MLD according to a TID: that is, per-TID queue size (buffered traffic amount) information for a corresponding non-AP MLD is included FIG. 44 illustrates an embodiment of a method of operating an STA MLD.

Referring to FIG. 44, the STA MLD may include a plurality of STAs, and each STA may operate on a different link.

The STA MLD may receive a beacon frame (S4410). For example, the STA MLD may receive, from an access point (AP) MLD through a first link, a beacon frame including a traffic indication map (TIM) and buffer information related to an amount of traffic to be transmitted by the AP MLD to the STA MLD.

For example, information related to the amount of traffic to be transmitted to the STA MLD may be classified according to an access category (AC).

For example, the information on the amount of traffic to be transmitted to the STA MLD may be classified according to a traffic identifier (TID).

For example, the buffer information may include information related to the amount of traffic to be transmitted to each of STAs included in the STA MLD.

For example, the information related to the amount of traffic to be transmitted to each of the STAs included in the STA MLD may be classified according to a TID.

For example, the information related to the amount of traffic to be transmitted to each of the STAs included in the STA MLD may be classified according to an AC.

Method 0: Upon receiving traffic for a TID mapped to all available links in the non-AP MLD, an AP reports to the non-AP MLD about the corresponding all available links (or corresponding STAs) through a traffic indication bitmap, and the non-AP MLD uses this information to transition a state of a non-AP STA corresponding to each link to an awake state.

APs 1, 2, and 3 may be present in an AP MLD, and STAs 1, 2, and 3 may be present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present in the STAs 1, 2, and 3. That is, even if corresponding buffer traffic is present in the STAs 1, 2, and 3, the AP (or AP MLD) may transmit a traffic indication to corresponding STAs in order to awaken some of the three STAs. The STAs 1, 2, and 3 of the non-AP MLD transition to the awake state, and when transmitting a UL frame, may inform the AP MLD (or AP) that the STAs 1, 2, and 3 are awakened. The AP may transmit a DL frame to two STAs (STA1, STA2) among them.

Method 1: An AP MLD (or AP) provides a non-AP MLD (or non-AP STA) with at least one of a buffer status report for a corresponding non-AP MLD, a buffer status report for each STA in the non-AP MLD, and a buffer status report per TID in each STA of the non-AP MLD Buffer status report information of a terminal (e.g., non-AP MLD) to which the AP transfers buffer information may include at least one piece of information described below.
1) The total amount of the entire buffered traffic for the non-AP MLD (i.e., Queue size all of the non-AP MLD)
2) The total amount of buffered traffic for each STA in the non-AP MLD (i.e., Queue size all of each non-AP STA): that is, sum information of all queues for respective STAs
3) The amount of per-AC (access category, e.g., AC_VI, AC_VO, AC_BE, AC_BK) buffered traffic in each non-AP STA: that is, queue information corresponding to each AC is included in each STA
4) The amount of per-TID buffered traffic in each non-AP STA: that is, queue information corresponding to each TID is included in each STA
5) Report the amount of buffered traffic by distinguishing the received buffered traffic for STAs in the non-AP MLD according to an AC: that is, per-AC queue size information for a corresponding non-AP MLD is included
6) Report the amount of buffered traffic by distinguishing the received buffered traffic for STAs in the non-AP MLD according to a TID: that is, per-TID queue size (buffered traffic amount) information for a corresponding non-AP MLD is included In addition, buffer information to be transmitted by the AP MLD may include at least one piece of information (e.g., ACI Bitmap, Delta TID, ACI High, Scaling Factor, Queue Size High, Queue Size All, etc.) included in the existing buffer status report (BSR) control field.

Although the amount of the entire buffer traffic of the non-AP MLD is reported in the description of the present specification, it is obvious that one or more pieces of information listed above may be included in buffer status information for the non-AP MLD, transmitted by the AP.

When the non-AP MLD receives BSR information (i.e., at least one of BSR information of the aforementioned non-AP MLD, BSR information for each of STAs in the non-AP MLD, per-AC queue size information in each non-AP STA of the non-AP MLD, per-TID BSR information in each non-AP STA in the non-AP MLD, per-AC BSR information in the non-AP MLD, per-TID BSR information in the non-AP MLD) corresponding to the non-AP MLD from the AP MLD, the non-AP MLD may determine how many links (i.e., STAs mapped to the links) will be awakened based on the information. The non-AP MLD (or non-AP STA) may report to an associated AP MLD (or AP) about which STAs (or links corresponding to the STAs) have been awakened. The AP MLD (or AP) may transmit a DL frame through a corresponding link, based on information transmitted by a terminal (information on which non-AP STA in the non-AP has been awakened).

APs 1, 2, and 3 may be present in an AP MLD, and STAs 1, 2, and 3 may be present in a non-AP MLD. The STAs 1, 2, and 3 of the non-AP are associated respectively with the APs 1, 2, and 3.

When transmitting a DL frame to the STA1 through a link1, the AP MLD (or AP1) may transmit to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (i.e., link2) may be awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) may transmit the DL frame to the STA1 and the STA2 through the link1 and the link2.

Detailed transmission method 1-1: The AP MLD (or AP STA) may perform transmission by including the buffer status report information defined above for the non-AP MLD (or non-AP STA) together in a corresponding frame (e.g., beacon frame) when transmitting a traffic indication map for a multi-link. The non-AP MLD (or non-AP STA) uses the buffer status report information included in the beacon frame to determine how many links (or STAs corresponding to the links) will be awakened among multiple links, and transmits a frame including information on the awake links/STAs to the AP to report this.

APs 1, 2, and 3 may be present in an AP MLD, and STAs 1, 2, and 3 may be present in a non-AP MLD. The STAs 1, 2, and 3 of the non-AP are associated respectively with the APs 1, 2, and 3. It is assumed that all TIDs for the non-AP MLD are mapped to available links through default TID-to-link mapping.

When the AP1 transmits a beacon through the link1, buffered traffic information for other links/other STAs may be transmitted, and since TIDs are mapped to all available links, a TIM for awakening only a corresponding STA (e.g., STA1) is transmitted. Even if information for awakening only the STA1 is contained in the TIM, the non-AP MLD (or STA1) may also awaken an STA for another link since the TIDs are mapped to all links. For example, the non-AP MLD may additionally transition the STA2 to the awake state. The non-AP MLD may determine how many links will be additionally awakened, based on BSR information for the non-AP MLD, included in the received beacon frame. The non-AP STA1 may transmit to the AP1 a UL frame including information for recognizing a certain link for which STAs have transitioned to the awake state. For example, the non-AP STA1 may report to the AP MLD that the STA1 and the STA2 are in the awake state. Upon receiving a frame including information indicating that the STA1 and the STA2 are in the awake state, the AP MLD may transmit an immediate acknowledgment for a UL frame, and may transmit buffered traffic (e.g., a DL frame) to the STA1 and STA2.

APs 1, 2, and 3 may be present in an AP MLD1, and STAs 1, 2, and 3 may be present in a non-AP MLD1. The STAs 1, 2, and 3 of the non-AP are respectively associated with the APs 1, 2, and 3.

When the AP MLD1 (e.g., AP1) awakens the STAs through a TIM, information on the AP MLD1 may be included, instead of STA information. The STA1 may know that the non-AP MLD1 is an MLD to which the STA1 belongs, and the non-AP MLD1 may know that TIDs are mapped to multiple links (i.e., all available links). As shown in FIG. 24, the non-AP MLD1 may determine how many links will be additionally awakened, based on BSR information of the non-AP MLD, included in a beacon. For example, the non-AP MLD1 may awaken only the STA2 (the STA1 is already in an awake state, and the STA2 is transitioned to the awake state, so that the STAs 1 and 2 are in the awake state). The rest of the operation is the same as in the example of FIG. 23.

APs 1, 2, and 3 may be present in an AP MLD1, and STAs 1, 2, and 3 may be present in a non-AP MLD1. The STAs 1, 2, and 3 are respectively associated with the APs 1, 2, and 3.

When a traffic indication is transmitted through a beacon frame, the AP MLD1 (or AP1) indicates STAs (STAs 1, 2, and 3) for all available links mapped to a TID. The non-AP MLD1 (or STA1) may determine how many links will be awakened based on BSR information for the non-AP MLD included in a beacon, even if corresponding information is received. For example, an example of additionally awakening the STA2 for a link2 is illustrated. The rest of operation is the same as in the example of FIG. 23.

The ML-BSR element may be an ML-BSR element including BSR information included in a beacon frame. Hereinafter, information included in the ML-BSR element is described.

Non-AP MLD information: indicates to which non-AP MLD the information is related. That is, the non-AP STA may know to which MLD the BSR information is related, by referring to non-AP MLD information.

Method A: It may consist of a field indicating the number of non-AP MLDs and an ID field indicating the non-AP MLD, and the non-AP MLD IDs as many as the number of non-AP MLDs may be included in the non-AP MLD information field.

A non-AP MLD ID may be an AID of one STA belonging to a non-AP MLD. In this case, when STAs belonging to an MLD have different AIDs, the STAs belonging to the MLD shall know AIDs of different STAs in the same MLD. If the STAs belonging to the MLD have the same AID, there is no need to separately store the AIDs of the different STAs.

If the STAs have the same or different AIDs, a method for identifying this is additionally required.

Method B: Non-AP MLD information may be configured in a bitmap format, and bits may be mapped to respective non-AP MLDs. A queue size field for bits (MLDs) having a value of 1 may be included in a BSR element. In addition, bitmap size information may be included together.

When the same AID is allocated to STAs in the non-AP MLD, a non-AP MLD information bitmap may be constructed of bits which are set to 1 in a TIM bitmap (or multi-link (ML) TIM bitmap), and queue size information to be included correspond to the number of bits which are set to 1 in the non-AP MLD information bitmap. If the bitmap size information is included together, an MLD bitmap size is determined by a corresponding size, and a non-AP MLD (or non-AP STA) indicated by a first bit in the MLD bitmap is an MLD (or STA) corresponding to a first bit set to 1 in the TIM bitmap (or ML TIM bitmap), and a next bit is an MLD (or STA) corresponding to a second bit set to 1.

The bitmap size may be optionally included. If the bitmap size is included, a size of an MLD bitmap may be determined based on a bitmap size value. As described above, a first bit of an MLD bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included may correspond to the number of bits which are set to 1 in the MLD bitmap (i.e., the number of MLDs/STAs).

If AIDs of STAs in a non-AP MLD always have different values, the STAs store (remember) AIDs of other STAs belonging to the same MLD. Therefore, when referring to an MLD bitmap, if a bit indicating another STA belonging to the same MLD is set to 1 even if it is not a bit corresponding to the STA, the STA may operate by regarding that it indicates an MLD of the STA. As described above, a size of the MLD bitmap may be determined by a size indicated by a bitmap size. As described above, a first bit of the MLD corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

If the AIDs of the STAs may be identical or different, a method for identifying this may be additionally required.

Queue size of non-AP MLD: Queue size information for each non-AP MLD indicated by non-AP MLD information is included, and a queue size is repeated as many as the number of indicated non-AP MLDs. That is, a total size of the queue size is determined as (the size of one Queue size*the number of non-AP MLDs).

The ML-BSR element may be an ML-BSR element including BSR information included in a beacon frame. Hereinafter, information included in the ML-BSR element is described.

Non-AP STA information: indicates which non-AP STAs are included. That is, the non-AP STA may know which non-AP STA is indicated and whether a queue size for this is included, by referring to the non-AP TA information.

Method C: It may consist of a field indicating the number of non-AP MLDs and an ID field indicating the non-AP MLD, and the non-AP MLD IDs as many as the number of non-AP MLDs is included.

When different AIDs are always allocated to STAs in a non-AP MLD (e.g., unique AIDs are allocated to STAs in the MLD in one AID space), the number of non-AP STA IDs to be included may be the same as the number of non-AP STAs which shall include a queue size.

When the same AID is allocated to the STAs in the non-AP MLD, a method for identifying this is required.

For example, non-AP STA ID information may include a non-AP STA ID and link information (e.g., link ID) to identify the STAs in the MLD.

Method D: Non-AP STA information may be configured in a bitmap format, and bits may be mapped to respective non-AP STAs. A queue size field for bits (i.e., STAs) having a value of 1 may be included. In addition, bitmap size information may be included together.

When the STAs in the non-AP MLD always have different values and it is possible to indicate all STAs in the non-AP MLD, terminals set to 1 in a TIM bitmap are constructed of terminals of non-AP STA information. In the presence of bitmap size information, a size of a non-AP STA bitmap is determined by a size indicated in a size field, and in the absence of the bitmap size information, the size of the non-AP STA bitmap is determined by the number of bits set to 1 in the TIM bitmap (or ML-TIM bitmap). Therefore, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

A bitmap size may be optionally included. If the bitmap size is included, a size of an MLD bitmap may be determined based on a bitmap size value. As described above, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included corresponds to the number of bits which are set to 1 in the MLD bitmap (i.e., the number of MLDs/STAs).

Queue size of non-AP STA: Queue size information for each non-AP STA indicated by non-AP STA information is included, and a queue size is repeated as many as the number of indicated non-AP STAs. That is, a total size of the queue size is determined as (the size of one Queue size*the number of non-AP STAs).

Method 2: Upon receiving traffic for a TID with default TID-to-link mapping (i.e., the TID is mapped to all available links), an AP transmits traffic indication information only for STAs corresponding to links for one or more links among all available links. A non-AP MLD awakens a corresponding terminal, based on information indicated by the traffic indication information, and transmits to an AP MLD/AP a frame including information on the awakened STAs to report which terminal is awake.

APs 1, 2, and 3 may be present in an AP MLD, and STAs 1, 2, and 3 may be present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present in the STAs 1, 2, and 3. That is, even if corresponding buffer traffic is present in the STAs 1, 2, and 3, the AP (or AP MLD) may transmit a traffic indication to corresponding STAs in order to awaken some of the three STAs.

For example, when transmitting a DL frame to the STA1 through the link1, the AP MLD (i.e., AP1) may transmit information for transitioning the STA2 (i.e., indicating that the STA2 also has buffered traffic) to an awake state to the STA1 (or a non-AP MLD of the STA1) together with an indication indicating a presence of buffered traffic. The non-AP MLD may transition the STA1 and the STA2 (link2) to the awake state, based on information received from the AP, and when transmitting a UL frame to the AP (or AP MLD), may perform transmission by including information indicating that the STA1 and the STA2 are awakened (i.e., information indicating that it is ready to receive the DL frame). The AP (or AP MLD) may transmit the DL frame to the STA1 and the STA2 through the link1 and the link2.

When transmitting the DL frame to the STA1 through the link1, the AP MLD (or AP1) transmits to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (link2) is awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) transmits the DL frame to the STA1 and the STA2 through the link1 and the link2.

Detailed transmission method: The AP MLD (or AP STA) performs transmission by including the buffer status report information defined above for the non-AP MLD (or non-AP STA) together in a corresponding frame (e.g., a DL data frame) when transmitting an individually address (e.g., unicast) frame to a terminal in an awake state. The non-AP MLD (or non-AP STA) uses the buffer status report information included in the DL frame to determine whether to transition some links (or STAs corresponding to the links) to the awake state among multiple links, and transmits an uplink frame including information on the awake links/STAs to the AP to report this.

APs 1, 2, and 3 are present in an AP MLD, and STAs 1, 2, and 3 are present in a non-AP MLD. The STAs 1, 2, and 3 are associated respectively with the APs 1, 2, and 3. It is assumed that all TID(s) for the non-AP MLD are mapped to available links through default TID-to-link mapping.

For example, when the AP1 transmits a beacon through the link1, buffered traffic information for other links/other STAs may be transmitted. Since TIDs are mapped to all available links, the AP MLD may transmit a beacon frame including a TIM for awakening only a corresponding STA (e.g., STA1). Even if information for awakening only the STA1 is contained in the TIM, and even if the TIDs are mapped to all links, the non-AP MLD (or STA1) transitions the STA1 to the awake state. Thereafter, the STA1 may transmit to the AP a UL frame (e.g., PS-poll or QoS null) for reporting that the STA1 is awakened, and may receive an Ack frame in response thereto. When the AP1 transmits a DL frame to the STA1, buffer status information (e.g., BSR or queue size) for a non-AP MLD corresponding to the STA1 may be included and transmitted. When the STA1 receives the DL frame, how many available links thereof will be awakened may be determined upon receiving BSR information for the non-AP MLD. Although only the BSR information for the non-AP MLD is mentioned to describe embodiments of the present specification, it may be replaced with including one or more of various types of BSRs (e.g., BSR information for each STA in the non-AP MLD, or BSR information for each of ACs (or TIDs) of the non-AP MLD). FIG. 33 illustrates an example of transitioning the STA2 for the link2 from the doze state to the awake state. This example shows that the STA1 receives a DL frame and then transmits ACK/BA to the AP1 in response thereto. A subsequent operation of the STA (non-AP MLD) and the AP (/AP MLD) may perform one or more of the following operations.

1) The AP1 (or AP MLD) which has received a response frame (ACK/BA) for DL frame transmission including BSR for the non-AP MLD may transmit a DL frame also through another link (link 2). However, there is a problem in that whether the STA2 is awakened cannot be guaranteed.

2) When the non-AP STA (STA1) receives the BSR for the non-AP MLD, links to be awakened (or STAs to be mapped to the links) are determined based on BSR information, and information of the awakened STA is included and transmitted when a UL frame is transmitted. The AP may transmit a DL frame through multiple links, based on information of an awakened terminal, included in the UL frame.

APs 1, 2, and 3 are present in an AP MLD, and STAs 1, 2, and 3 are present in a non-AP MLD. The STAs 1, 2, and 3 are respectively associated with the APs 1, 2, and 3.

The STA1 may determine to additionally transition the STA2 (link2) to an awake state, based on BSR information for the non-AP MLD included in a first DL frame. After the STA2 is awakened, in order to report that the STA2 is awakened, information thereon is transmitted by being included in a UL frame when the STA1 transmits the UL frame. Thereafter, the AP MLD may transmit the DL frame to the non-AP MLD by using the link 1 and the link 2.

Instead of reporting by the STA1 to the AP MLD (or AP1) that "the STA2 has transitioned to the awake state", the STA2 may report through the link 2 that the STA2 has transitioned to the awake state. An example thereof is described below with reference to FIG. 35.

APs 1, 2, and 3 are present in an AP MLD, and STAs 1, 2, and 3 are present in a non-AP MLD. The STAs 1, 2, and 3 are respectively associated with the APs 1, 2, and 3.

The STA1 (or non-AP MLD) may determine to additionally transition the STA2 (link2) to an awake state, based on BSR information for the non-AP MLD included in a first DL frame. After the STA2 is awakened, in order to report that the STA2 is awakened, the STA2 may transmit a UL frame through the link2. The AP MLD which has received the UL frame (e.g., PS-poll/QoS null frame) from the STA2 through the link2 may know that the STA2 has been awakened, and may transmit the DL frame to the non-AP MLD by using the link1 and the link 2.

A method of transmitting information (e.g., BSR information) related to data to be transmitted by the AP MLD to the STA MLD may be roughly classified into two types as follows.

1. A method in which the information (e.g., BSR information) related to the data to be transmitted by the AP MLD to the STA MLD is included in a beacon frame (the method of FIG. 21 to FIG. 32)
2. A method in which only a TIM related to data to be transmitted by the AP MLD to the STA MLD is transmitted through a beacon frame, and the information (e.g., BSR information) related to the data to be transmitted by the AP MLD to the STA MLD is transmitted through a subsequent DL frame (e.g., a data frame) (the method of FIG. 33 to FIG. 35)

The AP MLD may use both of the two methods. For example, the AP MLD may determine how to transmit BSR information to the STA MLD according to a type of traffic, i.e., AC (or TID). For example, the AP MLD may transmit the BSR information to the STA MLD through the first method (or second method) upon receiving traffic of an AC requiring low latency, and may transmit the BSR information to the STA MLD through the second (or first method) upon receiving traffic of an AC not requiring relatively low latency.

Herein, the AC requiring low latency may be a new AC defined additionally for low-latency transmission, or may be traffic requiring relatively low latency among the existing ACs such as AC_VO, AC_VI, or the like. The AC requiring low latency may vary depending on a situation, and is not limited thereto.

The STA MLD may determine an awake STA (S4420). For example, the STA MLD may determine an STA to be transitioned from a doze state to an awake state among the plurality of STAs, based on the TIM and the buffer information.

The STA MLD may transmit awake STA information (S4430). For example, the STA MLD may transmit to the AP MLD the awake STA information related to the STA to be transitioned from the doze state to the awake state.

The STA MLD may receive data (S4440). For example, the STA MLD may receive from the AP MLD the data through links related to the awake STA information.

Figure 45:
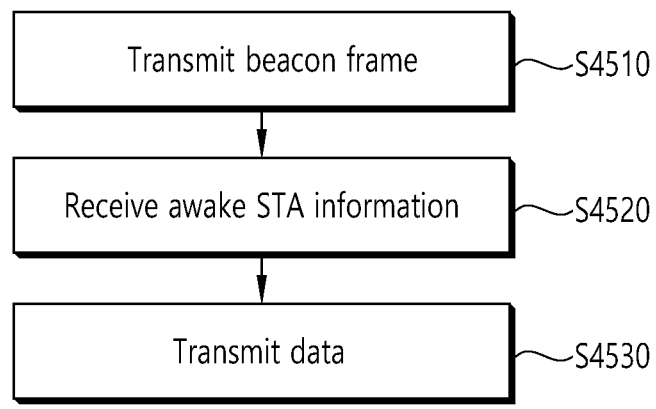
FIG. 45 illustrates an embodiment of a method of operating an AP MLD.

FIG. 45 illustrates an embodiment of a method of operating an AP MLD.

Referring to FIG. 45, the AP MLD may include a plurality of APs, and each AP may operate on a different link.

The AP MLD may transmit a beacon frame (S4510). For example, the AP MLD may transmit, to an STA MLD through a first link, a beacon frame including a traffic indication map (TIM) and buffer information related to an amount of traffic to be transmitted by the AP MLD to the STA MLD.

For example, information related to the amount of traffic to be transmitted to the STA MLD may be classified according to an access category (AC).

For example, the information on the amount of traffic to be transmitted to the STA MLD may be classified according to a traffic identifier (TID).

For example, the buffer information may include information related to the amount of traffic to be transmitted to each of STAs included in the STA MLD.

For example, the information related to the amount of traffic to be transmitted to each of the STAs included in the STA MLD may be classified according to a TID.

For example, the information related to the amount of traffic to be transmitted to each of the STAs included in the STA MLD may be classified according to an AC.

Method 0: Upon receiving traffic for a TID mapped to all available links in the non-AP MLD, an AP reports to the non-AP MLD about the corresponding all available links (or corresponding STAs) through a traffic indication bitmap, and the non-AP MLD uses this information to transition a state of a non-AP STA corresponding to each link to an awake state.

APs 1, 2, and 3 may be present in an AP MLD, and STAs 1, 2, and 3 may be present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present in the STAs 1, 2, and 3. That is, even if corresponding buffer traffic is present in the STAs 1, 2, and 3, the AP (or AP MLD) may transmit a traffic indication to corresponding STAs in order to awaken some of the three STAs. The STAs 1, 2, and 3 of the non-AP MLD transition to the awake state, and when transmitting a UL frame, may inform the AP MLD (or AP) that the STAs 1, 2, and 3 are awakened. The AP may transmit a DL frame to two STAs (STA1, STA2) among them.

Method 1: An AP MLD (or AP) provides a non-AP MLD (or non-AP STA) with at least one of a buffer status report for a corresponding non-AP MLD, a buffer status report for each STA in the non-AP MLD, and a buffer status report per TID in each STA of the non-AP MLD Buffer status report information of a terminal (e.g., non-AP MLD) to which the AP transfers buffer information may include at least one piece of information described below.
1) The total amount of the entire buffered traffic for the non-AP MLD (i.e., Queue size all of the non-AP MLD)
2) The total amount of buffered traffic for each STA in the non-AP MLD (i.e., Queue size all of each non-AP STA): that is, sum information of all queues for respective STAs
3) The amount of per-AC (access category, e.g., AC_VI, AC_VO, AC_BE, AC_BK) buffered traffic in each non-AP STA: that is, queue information corresponding to each AC is included in each STA
4) The amount of per-TID buffered traffic in each non-AP STA: that is, queue information corresponding to each TID is included in each STA
5) Report the amount of buffered traffic by distinguishing the received buffered traffic for STAs in the non-AP MLD according to an AC: that is, per-AC queue size information for a corresponding non-AP MLD is included
6) Report the amount of buffered traffic by distinguishing the received buffered traffic for STAs in the non-AP MLD according to a TID: that is, per-TID queue size (buffered traffic amount) information for a corresponding non-AP MLD is included In addition, buffer information to be transmitted by the AP MLD may include at least one piece of information (e.g., ACI Bitmap, Delta TID, ACI High, Scaling Factor, Queue Size High, Queue Size All, etc.) included in the existing buffer status report (BSR) control field.

Although the amount of the entire buffer traffic of the non-AP MLD is reported in the description of the present specification, it is obvious that one or more pieces of information listed above may be included in buffer status information for the non-AP MLD, transmitted by the AP.

When the non-AP MLD receives BSR information (i.e., at least one of BSR information of the aforementioned non-AP MLD, BSR information for each of STAs in the non-AP MLD, per-AC queue size information in each non-AP STA of the non-AP MLD, per-TID BSR information in each non-AP STA in the non-AP MLD, per-AC BSR information in the non-AP MLD, per-TID BSR information in the non-AP MLD) corresponding to the non-AP MLD from the AP MLD, the non-AP MLD may determine how many links (i.e., STAs mapped to the links) will be awakened based on the information. The non-AP MLD (or non-AP STA) may report to an associated AP MLD (or AP) about which STAs (or links corresponding to the STAs) have been awakened. The AP MLD (or AP) may transmit a DL frame through a corresponding link, based on information transmitted by a terminal (information on which non-AP STA in the non-AP has been awakened).

APs 1, 2, and 3 may be present in an AP MLD, and STAs 1, 2, and 3 may be present in a non-AP MLD. The STAs 1, 2, and 3 of the non-AP are associated respectively with the APs 1, 2, and 3.

When transmitting a DL frame to the STA1 through a link1, the AP MLD (or AP1) may transmit to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (i.e., link2) may be awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) may transmit the DL frame to the STA1 and the STA2 through the link1 and the link2.

Detailed transmission method 1-1: The AP MLD (or AP STA) may perform transmission by including the buffer status report information defined above for the non-AP MLD (or non-AP STA) together in a corresponding frame (e.g., beacon frame) when transmitting a traffic indication map for a multi-link. The non-AP MLD (or non-AP STA) uses the buffer status report information included in the beacon frame to determine how many links (or STAs corresponding to the links) will be awakened among multiple links, and transmits a frame including information on the awake links/STAs to the AP to report this.

APs 1, 2, and 3 may be present in an AP MLD, and STAs 1, 2, and 3 may be present in a non-AP MLD. The STAs 1, 2, and 3 of the non-AP are associated respectively with the APs 1, 2, and 3. It is assumed that all TIDs for the non-AP MLD are mapped to available links through default TID-to-link mapping.

When the AP1 transmits a beacon through the link1, buffered traffic information for other links/other STAs may be transmitted, and since TIDs are mapped to all available links, a TIM for awakening only a corresponding STA (e.g., STA1) is transmitted. Even if information for awakening only the STA1 is contained in the TIM, the non-AP MLD (or STA1) may also awaken an STA for another link since the TIDs are mapped to all links. For example, the non-AP MLD may additionally transition the STA2 to the awake state. The non-AP MLD may determine how many links will be additionally awakened, based on BSR information for the non-AP MLD, included in the received beacon frame. The non-AP STA1 may transmit to the AP1 a UL frame including information for recognizing a certain link for which STAs have transitioned to the awake state. For example, the non-AP STA1 may report to the AP MLD that the STA1 and the STA2 are in the awake state. Upon receiving a frame including information indicating that the STA1 and the STA2 are in the awake state, the AP MLD may transmit an immediate acknowledgment for a UL frame, and may transmit buffered traffic (e.g., a DL frame) to the STA1 and STA2.

APs 1, 2, and 3 may be present in an AP MLD1, and STAs 1, 2, and 3 may be present in a non-AP MLD1. The STAs 1, 2, and 3 of the non-AP are respectively associated with the APs 1, 2, and 3.

When the AP MLD1 (e.g., AP1) awakens the STAs through a TIM, information on the AP MLD1 may be included, instead of STA information. The STA1 may know that the non-AP MLD1 is an MLD to which the STA1 belongs, and the non-AP MLD1 may know that TIDs are mapped to multiple links (i.e., all available links). As shown in FIG. 24, the non-AP MLD1 may determine how many links will be additionally awakened, based on BSR information of the non-AP MLD, included in a beacon. For example, the non-AP MLD1 may awaken only the STA2 (the STA1 is already in an awake state, and the STA2 is transitioned to the awake state, so that the STAs 1 and 2 are in the awake state). The rest of the operation is the same as in the example of FIG. 23.

APs 1, 2, and 3 may be present in an AP MLD1, and STAs 1, 2, and 3 may be present in a non-AP MLD1. The STAs 1, 2, and 3 are respectively associated with the APs 1, 2, and 3.

When a traffic indication is transmitted through a beacon frame, the AP MLD1 (or AP1) indicates STAs (STAs 1, 2, and 3) for all available links mapped to a TID. The non-AP MLD1 (or STA1) may determine how many links will be awakened based on BSR information for the non-AP MLD included in a beacon, even if corresponding information is received. For example, an example of additionally awakening the STA2 for a link2 is illustrated. The rest of operation is the same as in the example of FIG. 23.

The ML-BSR element may be an ML-BSR element including BSR information included in a beacon frame. Hereinafter, information included in the ML-BSR element is described.

Non-AP MLD information: indicates to which non-AP MLD the information is related. That is, the non-AP STA may know to which MLD the BSR information is related, by referring to non-AP MLD information.

Method A: It may consist of a field indicating the number of non-AP MLDs and an ID field indicating the non-AP MLD, and the non-AP MLD IDs as many as the number of non-AP MLDs may be included in the non-AP MLD information field.

A non-AP MLD ID may be an AID of one STA belonging to a non-AP MLD. In this case, when STAs belonging to an MLD have different AIDs, the STAs belonging to the MLD shall know AIDs of different STAs in the same MLD. If the STAs belonging to the MLD have the same AID, there is no need to separately store the AIDs of the different STAs.

If the STAs have the same or different AIDs, a method for identifying this is additionally required.

Method B: Non-AP MLD information may be configured in a bitmap format, and bits may be mapped to respective non-AP MLDs. A queue size field for bits (MLDs) having a value of 1 may be included in a BSR element. In addition, bitmap size information may be included together.

When the same AID is allocated to STAs in the non-AP MLD, a non-AP MLD information bitmap may be constructed of bits which are set to 1 in a TIM bitmap (or multi-link (ML) TIM bitmap), and queue size information to be included correspond to the number of bits which are set to 1 in the non-AP MLD information bitmap. If the bitmap size information is included together, an MLD bitmap size is determined by a corresponding size, and a non-AP MLD (or non-AP STA) indicated by a first bit in the MLD bitmap is an MLD (or STA) corresponding to a first bit set to 1 in the TIM bitmap (or ML TIM bitmap), and a next bit is an MLD (or STA) corresponding to a second bit set to 1.

A bitmap size may be optionally included. If the bitmap size is included, a size of an MLD bitmap may be determined based on a bitmap size value. As described above, a first bit of an MLD bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included may correspond to the number of bits which are set to 1 in the MLD bitmap (i.e., the number of MLDs/STAs).

If AIDs of STAs in a non-AP MLD always have different values, the STAs store (remember) AIDs of other STAs belonging to the same MLD. Therefore, when referring to an MLD bitmap, if a bit indicating another STA belonging to the same MLD is set to 1 even if it is not a bit corresponding to the STA, the STA may operate by regarding that it indicates an MLD of the STA. As described above, a size of the MLD bitmap may be determined by a size indicated by a bitmap size. As described above, a first bit of the MLD corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

If the AIDs of the STAs may be identical or different, a method for identifying this may be additionally required.

Queue size of non-AP MLD: Queue size information for each non-AP MLD indicated by non-AP MLD information is included, and a queue size is repeated as many as the number of indicated non-AP MLDs. That is, a total size of the queue size is determined as (the size of one Queue size*the number of non-AP MLDs).

The ML-BSR element may be an ML-BSR element including BSR information included in a beacon frame. Hereinafter, information included in the ML-BSR element is described.

Non-AP STA information: indicates which non-AP STAs are included. That is, the non-AP STA may know which non-AP STA is indicated and whether a queue size for this is included, by referring to the non-AP TA information.

Method C: It may consist of a field indicating the number of non-AP MLDs and an ID field indicating the non-AP MLD, and the non-AP MLD IDs as many as the number of non-AP MLDs is included.

When different AIDs are always allocated to STAs in a non-AP MLD (e.g., unique AIDs are allocated to STAs in the MLD in one AID space), the number of non-AP STA IDs to be included may be the same as the number of non-AP STAs which shall include a queue size.

When the same AID is allocated to the STAs in the non-AP MLD, a method for identifying this is required.

For example, non-AP STA ID information may include a non-AP STA ID and link information (e.g., link ID) to identify the STAs in the MLD.

Method D: Non-AP STA information may be configured in a bitmap format, and bits may be mapped to respective non-AP STAs. A queue size field for bits (i.e., STAs) having a value of 1 may be included. In addition, bitmap size information may be included together.

When the STAs in the non-AP MLD always have different values and it is possible to indicate all STAs in the non-AP MLD, terminals set to 1 in a TIM bitmap are constructed of terminals of non-AP STA information. In the presence of bitmap size information, a size of a non-AP STA bitmap is determined by a size indicated in a size field, and in the absence of the bitmap size information, the size of the non-AP STA bitmap is determined by the number of bits set to 1 in the TIM bitmap (or ML-TIM bitmap). Therefore, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner.

A bitmap size may be optionally included. If the bitmap size is included, a size of an MLD bitmap may be determined based on a bitmap size value. As described above, a first bit of an STA bitmap corresponds to an MLD/STA which is set to a first '1' of a TIM/ML-TIM bitmap, a second bit corresponds to an ML/STA which is set to a second '1' of the TIM/ML-TIM bitmap, and the remaining bits are also configured in this manner. A queue size to be included corresponds to the number of bits which are set to 1 in the MLD bitmap (i.e., the number of MLDs/STAs).

Queue size of non-AP STA: Queue size information for each non-AP STA indicated by non-AP STA information is included, and a queue size is repeated as many as the number of indicated non-AP STAs. That is, a total size of the queue size is determined as (the size of one Queue size*the number of non-AP STAs).

Method 2: Upon receiving traffic for a TID with default TID-to-link mapping (i.e., the TID is mapped to all available links), an AP transmits traffic indication information only for STAs corresponding to links for one or more links among all available links. A non-AP MLD awakens a corresponding terminal, based on information indicated by the traffic indication information, and transmits to an AP MLD/AP a frame including information on the awakened STAs to report which terminal is awake.

The AP MLD may receive awake STA information (S4520). For example, the AP MLD may receive from the STA MLD the awake STA information related to the STA to be transitioned from the doze state to the awake state.

The AP MLD may transmit data (S4530). For example, the AP MLD may transmit to the STA MLD the data through links related to the awake STA information.

Some of detailed steps shown in the example of FIG. 44 and FIG. 45 may not be essential steps and may be omitted. Other steps may be added in addition to the steps shown in FIG. 44 and FIG. 45, and orders of the steps may vary. Some steps the above steps may have independent technical meaning.

The aforementioned technical feature of the present specification may be applied to various devices and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, the device of the present specification includes a memory and a processor operatively connected to the memory. The processor may be adapted to receive, by a station (STA) multi-link device (MLD) from an access point (AP) MLD through a first link, a beacon frame including a traffic indication map (TIM) and buffer information related to an amount of traffic to be transmitted by the AP MLD to the STA MLD, and determine, by the STA MLD, an STA to be transitioned from a doze state to an awake state among a plurality of STAs included in the STA MLD, based on the TIM and the buffer information.

The technical feature of the present specification may be implemented based on a computer readable medium (CRM). For example, the CRM proposed by the present specification is at least one computer readable medium having an instruction executed by at least one processor of a WLAN system to perform an operation including: receiving, by an STA MLD from an AP MLD through a first link, a beacon frame including a TIM and buffer information related to an amount of traffic to be transmitted by the AP MLD to the STA MLD, and determining, by the STA MLD, an STA to be transitioned from a doze state to an awake state among the plurality of STAs, based on the TIM and the buffer information.

Instructions stored in a CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method comprising:
receiving, by a non-access point (non-AP) multilink device (MLD) from an access point (AP) MLD through a first link, a beacon frame including a traffic indication map (TIM) and buffer information related to an amount of traffic to be transmitted by the AP MLD to the non-AP MLD, wherein the non-AP MLD includes a first non-AP station (STA) operating on the first link, wherein the non-AP MLD further includes a second non-AP STA operating on a second link being different from the first link, wherein the beacon frame further includes first information related to whether the first link and the second link belong to a link pair supporting a simultaneous transmit and receive (STR) operation, wherein the beacon frame further includes second information related to a maximum number of links supported by the non-AP MLD, wherein the beacon frame further includes third information indicating at least one traffic identifier (TID) mapped to the first link and at least one TID mapped to the second link;

determining, by the non-AP MLD, a non-AP STA to be transitioned from a doze state to an awake state among a plurality of non-AP STAs including the first non-AP STA and the second non-AP STA based on the TIM and the buffer information; and transmitting, by the non-AP MLD, a physical protocol data unit (PPDU) through the determined non-AP STA, wherein the PPDU includes a legacy signal (L-SIG) field, a repeated L-SIG (RL-SIG) field being contiguous to the L-SIG field, a control signal (SIG) field being contiguous to the RL-SIG field, wherein a length field in the L-SIG field is set to a value satisfying a condition a remainder is zero when the length field is divided by three, wherein the control SIG field has a length of two symbols, wherein the control SIG field comprises version-independent bits followed by version-dependent bits, wherein the version-independent bits comprise a Physical (PHY) version Identifier having a length of three bits, and a value of the PHY version Identifier is used to identify a physical (PHY) version starting with Extremely High Throughput (EHT).

2. The method of claim 1, wherein the buffer information related to the amount of traffic to be transmitted to the non-AP MLD is classified according to an access category (AC).

3. The method of claim 1, wherein the buffer information on the amount of traffic to be transmitted to the non-AP MLD is classified according to a traffic identifier (TID).

4. The method of claim 1, wherein the buffer information includes information related to the amount of traffic to be transmitted to each of non-AP STAs included in the non-AP MLD.

5. A non-access point (non-AP) multi-link device (MLD) comprising:

a transceiver transmitting and receiving a radio signal; and a processor connected to the transceiver, wherein the processor is adapted to:

receive, from an access point (AP) MLD through a first link, a beacon frame including a traffic indication map (TIM) and buffer information related to an amount of traffic to be transmitted by the AP MLD to the non-AP MLD, wherein the non-AP MLD includes a first non-AP station (STA) operating on the first link, wherein the non-AP MLD further includes a second non-AP STA operating on a second link being different from the first link, wherein the beacon frame further includes first information related to whether the first link and the second link belong to a link pair supporting a simultaneous transmit and receive (STR) operation, wherein the beacon frame further includes second information related to a maximum number of links supported by the non-AP MLD, wherein the beacon frame further includes third information indicating at least one traffic identifier (TID) mapped to the first link and at least one TID mapped to the second link;

determine a non-AP STA to be transitioned from a doze state to an awake state among a plurality of non-AP STAs including the first non-AP STA and the second non-AP STA based on the TIM and the buffer information; and transmit a physical protocol data unit (PPDU) through the determined non-AP STA, wherein the PPDU includes a legacy signal (L-SIG) field, a repeated L-SIG (RL-SIG) field being contiguous to the L-SIG field, a control signal (SIG) field being contiguous to the RL-SIG field, wherein a length field in the L-SIG field is set to a value satisfying a condition a remainder is zero when the length field is divided by three, wherein the control SIG field has a length of two symbols, wherein the control SIG field comprises version-independent bits followed by version-dependent bits, wherein the version-independent bits comprise a Physical (PHY) version Identifier having a length of three bits, and a value of the PHY version Identifier is used to identify a physical (PHY) version starting with Extremely High Throughput (EHT).

6. The non-AP MLD of claim 5, wherein the buffer information related to the amount of traffic to be transmitted to the non-AP MLD is classified according to an access category (AC).

7. The non-AP MLD of claim 5, wherein the buffer information on the amount of traffic to be transmitted to the non-AP MLD is classified according to a traffic identifier (TID).

8. The non-AP MLD of claim 5, wherein the buffer information includes information related to the amount of traffic to be transmitted to each of non-AP STAs included in the non-AP MLD.

* * * * *